US010558981B1

(12) United States Patent
Wang et al.

(10) Patent No.: US 10,558,981 B1
(45) Date of Patent: Feb. 11, 2020

(54) METHODS SYSTEMS AND ARTICLES OF MANUFACTURE FOR GENERATING TAX WORKSHEET APPLICATION

(75) Inventors: Gang Wang, San Diego, CA (US); Jeffrey P. Ludwig, San Diego, CA (US)

(73) Assignee: INTUIT INC., Mountain View, CA (US)

( * ) Notice: Subject to any disclaimer, the term of this patent is extended or adjusted under 35 U.S.C. 154(b) by 945 days.

(21) Appl. No.: 13/598,566

(22) Filed: Aug. 29, 2012

(51) Int. Cl.
*G06Q 40/00* (2012.01)
*G06Q 30/00* (2012.01)

(52) U.S. Cl.
CPC .................................. *G06Q 30/00* (2013.01)

(58) Field of Classification Search
CPC .................................................... G06Q 30/02
USPC .......................................................... 705/31
See application file for complete search history.

(56) References Cited

U.S. PATENT DOCUMENTS 6,233,592 B1 * 5/2001 Schnelle ................. G06F 17/21 715/205
8,156,018 B1 * 4/2012 Quinn ................. G06F 17/2264 705/19
2002/0194221 A1 * 12/2002 Strong ................ G06F 17/2247 715/238
2006/0271451 A1 * 11/2006 Varughese ............ G06F 17/243 705/31
2006/0282354 A1 * 12/2006 Varghese ............... G06Q 40/02 705/32
2008/0147494 A1 * 6/2008 Larson ............... G06Q 30/0234 705/14.34
2010/0131394 A1 * 5/2010 Rutsch ................... G06Q 40/02 705/31
2012/0030136 A1 * 2/2012 Rosenberg ............. G06Q 40/00 705/36 R

OTHER PUBLICATIONS http://www.googobits.com/articles/p5-827-what-files-should-i-keep-for-my-income-taxes.html.
http://www.irs.gov/publications/p505/15008e19.html.
www.turbotax.com.
De Marneffe, "Stanford typed dependencies manual" dated Sep. 2008, Revised for Stanford Parser v. 1.6.9 in Sep. 2011 (24 pages).
De Marneffe, "Generating Typed Dependency Parses from Phrase Structure Parses", Department of Computing Science, Universite catholique de Louvain (6 pages).

* cited by examiner

*Primary Examiner* — Abhishek Vyas
*Assistant Examiner* — John A Anderson
(74) *Attorney, Agent, or Firm* — DLA Piper LLP US

(57) ABSTRACT

Methods, systems and articles of manufacture for automatic generation of executable instructions based on a tax worksheet publication. Electronic data of the tax worksheet publication is received from a source such as a tax authority, converted into a different format and parsed, e.g., in the form of a parse tree or typed relationship graph. An interactive tax worksheet application embodying an executable instruction is generated based at least in part upon parsed electronic data.

24 Claims, 22 Drawing Sheets

10

28% Rate Gain Worksheet *Keep for Your Records*

1. Enter the total of all collectibles gain or (loss) from items reported on line 5, column (f), of Schedule D . . . . . 1. ______
2. Enter as a positive number the amount of any section 1202 exclusion reported on line 5, column (f), of Schedule D . . . . . 2. ______
3. Enter the total of all collectibles gain or (loss) from items reported on Schedule D, line 6 . . . . . 3. ______
4. Enter the total of all collectibles gain from capital gain distributions reported on line 7 of Schedule D . . . . . 4. ______
5. Enter the long-term capital loss carryover from Schedule D, line 9 . . . . . 5. (______)
6. If Schedule D, line 4, is a (loss), enter that (loss) here. Otherwise, enter -0- . . . . . 6. ______
7. Combine lines 1 through 6. If zero or less, enter -0- . . . . . 7. ______

FIG. 1
(PRIOR ART)

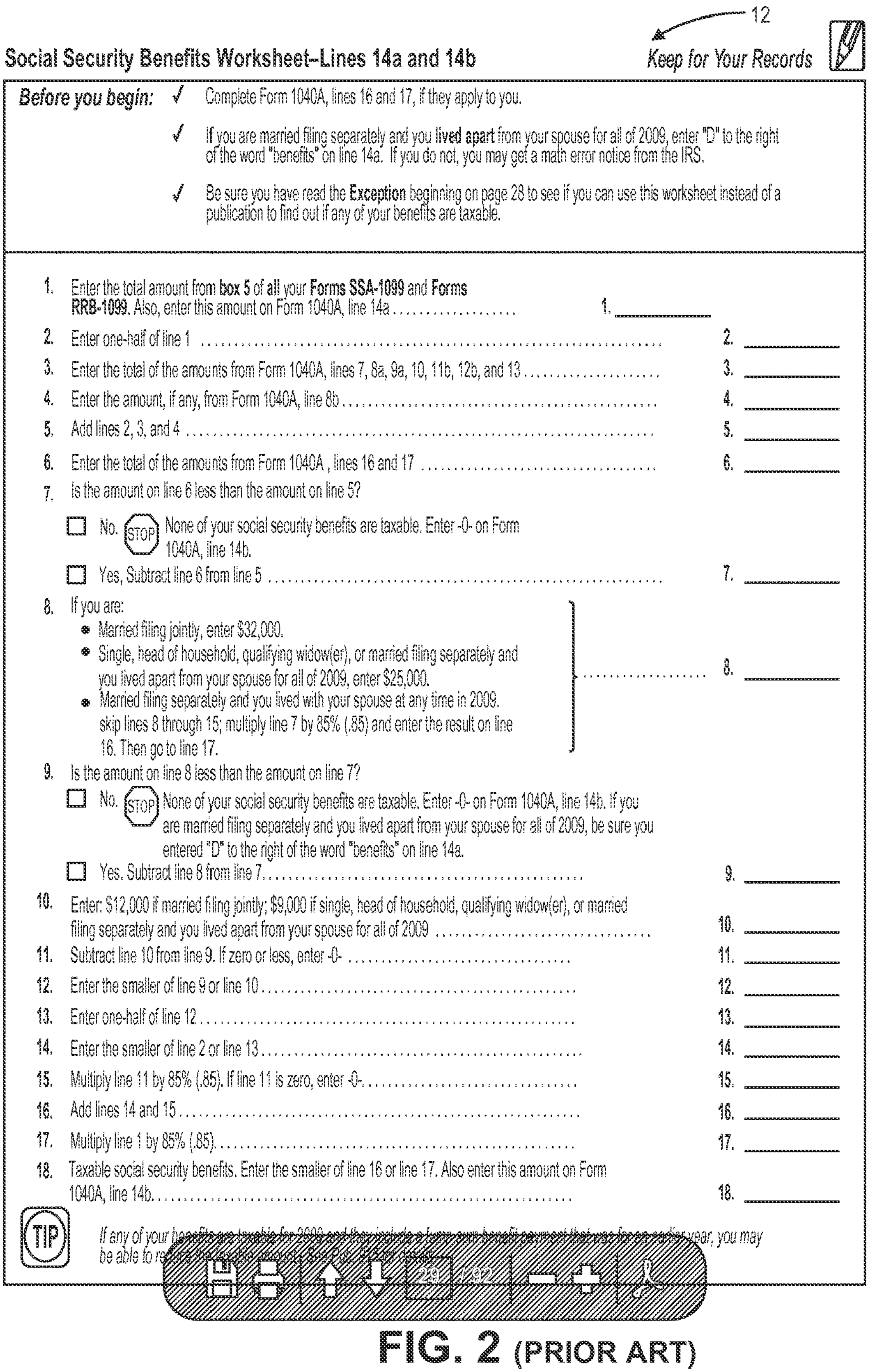

12

Social Security Benefits Worksheet–Lines 14a and 14b *Keep for Your Records*

*Before you begin:*

✓ Complete Form 1040A, lines 16 and 17, if they apply to you.

✓ If you are married filing separately and you lived apart from your spouse for all of 2009, enter "D" to the right of the word "benefits" on line 14a. If you do not, you may get a math error notice from the IRS.

✓ Be sure you have read the Exception beginning on page 28 to see if you can use this worksheet instead of a publication to find out if any of your benefits are taxable.

1. Enter the total amount from box 5 of all your Forms SSA-1099 and Forms RRB-1099. Also, enter this amount on Form 1040A, line 14a .................. 1. ______
2. Enter one-half of line 1 .................. 2. ______
3. Enter the total of the amounts from Form 1040A, lines 7, 8a, 9a, 10, 11b, 12b, and 13 .................. 3. ______
4. Enter the amount, if any, from Form 1040A, line 8b .................. 4. ______
5. Add lines 2, 3, and 4 .................. 5. ______
6. Enter the total of the amounts from Form 1040A , lines 16 and 17 .................. 6. ______
7. Is the amount on line 6 less than the amount on line 5?
   - ☐ No. STOP None of your social security benefits are taxable. Enter -0- on Form 1040A, line 14b.
   - ☐ Yes, Subtract line 6 from line 5 .................. 7. ______
8. If you are:
   - Married filing jointly, enter $32,000.
   - Single, head of household, qualifying widow(er), or married filing separately and you lived apart from your spouse for all of 2009, enter $25,000.
   - Married filing separately and you lived with your spouse at any time in 2009. skip lines 8 through 15; multiply line 7 by 85% (.85) and enter the result on line 16. Then go to line 17.

.................. 8. ______
9. Is the amount on line 8 less than the amount on line 7?
   - ☐ No. STOP None of your social security benefits are taxable. Enter -0- on Form 1040A, line 14b. If you are married filing separately and you lived apart from your spouse for all of 2009, be sure you entered "D" to the right of the word "benefits" on line 14a.
   - ☐ Yes. Subtract line 8 from line 7.................. 9. ______
10. Enter: $12,000 if married filing jointly; $9,000 if single, head of household, qualifying widow(er), or married filing separately and you lived apart from your spouse for all of 2009 .................. 10. ______
11. Subtract line 10 from line 9. If zero or less, enter -0- .................. 11. ______
12. Enter the smaller of line 9 or line 10.................. 12. ______
13. Enter one-half of line 12.................. 13. ______
14. Enter the smaller of line 2 or line 13.................. 14. ______
15. Multiply line 11 by 85% (.85). If line 11 is zero, enter -0-.................. 15. ______
16. Add lines 14 and 15.................. 16. ______
17. Multiply line 1 by 85% (.85).................. 17. ______
18. Taxable social security benefits. Enter the smaller of line 16 or line 17. Also enter this amount on Form 1040A, line 14b.................. 18. ______

TIP *If any of your benefits are taxable for 2009 and they include a lump-sum benefit payment that was for an earlier year, you may be able to reduce the taxable amount. See Pub. 915 for details.*

29 / 92

FIG. 2 (PRIOR ART)

```
- <worksheet id="w63610i02" iconname="noicon" width="1col" fullpgdepth="0" align="right" place="inline" whatpage="6" pgbrk="0" counter="0">
  - <title align="left" style="hd3" hdrule="0">
      <imark/>
      Itemized Deductions Worksheet--Line 6
    </title>
  - <table frame="all" colsep="0" rowsep="0" keep="on" pgwide="0" tabstyle="8" prespace="0" counter="0" orient="port" killrhead="0" summary="Itemized Deductions Worksheet for Line
      6 of Schedule AI" pgbrk="0">
    - <tgroup cols="4">
        <colspec colnum="1" colname="col1" colwidth="0.05*" align="right" valign="top" gutter=".3" />
        <colspec colnum="2" colname="col2" colwidth="0.84*" align="left" valign="top" gutter=".6" />
        <colspec colnum="3" colname="colspec5" colwidth="0.06*" align="right" valign="bottom" gutter=".3" />
        <colspec colnum="4" colname="col3" colwidth="0.20*" align="right" valign="bottom" gutter=".3" />
      - <tbody>
        - <row vspace="3pt" brk="0" tnote="0">
            <entry colname="col1" ldr="0" us="none" indent="noindt" emph="bld" entrybox="0" align="right" valign="top">1.</entry>
            <entry colname="col2" ldr="1" us="none" indent="noindt" entrybox="0" valign="top">Enter line 4 of Schedule AI</entry>
            <entry ldr="0" us="none" indent="noindt" emph="bld" entrybox="0" align="right" valign="bottom">1.</entry>
            <entry colname="col3" ldr="0" us="single" indent="noindt" entrybox="0" valign="bottom" />
          </row>
        - <row vspace="0.5" brk="0" tnote="0">
            <entry colname="col1" ldr="0" us="none" indent="noindt" emph="bld" entrybox="0" align="right" valign="top">2.</entry>
            <entry colname="col2" ldr="1" us="none" indent="noindt" entrybox="0" valign="top">Enter the amount included in line 1 for medical and dental expenses,
              investment interest, casualty for theft losses, and gambling losses (after applying the same limits used in line 1)</entry>
            <entry ldr="0" us="none" indent="noindt" emph="bld" entrybox="0" align="right" valign="bottom">2.</entry>
            <entry colname="col3" ldr="0" us="single" indent="noindt" entrybox="0" valign="bottom" />
          </row>
        - <row vspace="0.5" brk="0" tnote="0">
            <entry colname="col1" ldr="0" us="none" indent="noindt" emph="bld" entrybox="0" align="right" valign="top">3.</entry>
            <entry colname="col2" ldr="1" us="none" indent="noindt" entrybox="0" valign="top">Subtract line 2 from line 1</entry>
            <entry ldr="0" us="none" indent="noindt" emph="bld" entrybox="0" align="right" valign="bottom">3.</entry>
            <entry colname="col3" ldr="0" us="single" indent="noindt" entrybox="0" valign="bottom" />
          </row>
```

412/812

FIG. 8

```
- <row vspace="0.5" brk="0" tnote="0">
    <entry colname="col1" ldr="0" us="none" indent="noindt" emph="bld" entrybox="0" align="right" valign="top">4.</entry>
    <entry colname="col2" ldr="1" us="none" indent="noindt" entrybox="0" valign="top">Enter line 5 of Schedule AI</entry>
    <entry ldr="0" us="none" indent="noindt" emph="bld" entrybox="0" align="right" valign="bottom">4.</entry>
    <entry colname="col3" ldr="0" us="single" indent="noindt" entrybox="0" valign="bottom" />
  </row>
- <row vspace="0.5" brk="0" tnote="0">
    <entry colname="col1" ldr="0" us="none" indent="noindt" emph="bld" entrybox="0" align="right" valign="top">5.</entry>
    <entry colname="col2" ldr="1" us="none" indent="noindt" entrybox="0" valign="top">Multiply line 1 by line 4</entry>
    <entry ldr="0" us="none" indent="noindt" emph="bld" entrybox="0" align="right" valign="bottom">5.</entry>
    <entry colname="col3" ldr="0" us="single" indent="noindt" entrybox="0" valign="bottom" />
  </row>
- <row brk="0" tnote="0">
   <entry colname="col1" ldr="0" us="none" indent="noindt" emph="bld" entrybox="0" align="right" />
 - <entry colname="col2" colsep="0" rowsep="0" ldr="0" us="none" indent="noindt" entrybox="0">
     <bld>Note.</bld>
   - <itl>
       If line 3 is zero, your deduction is not limited.
       <bit>Stop</bit>
       here and enter line 5 above on Schedule AI, line 6.
     </itl>
   </entry>
```

FIG. 8 (cont.)

Typed Dependency Graph Generated for "Enter the smaller of line 2 or line 13"

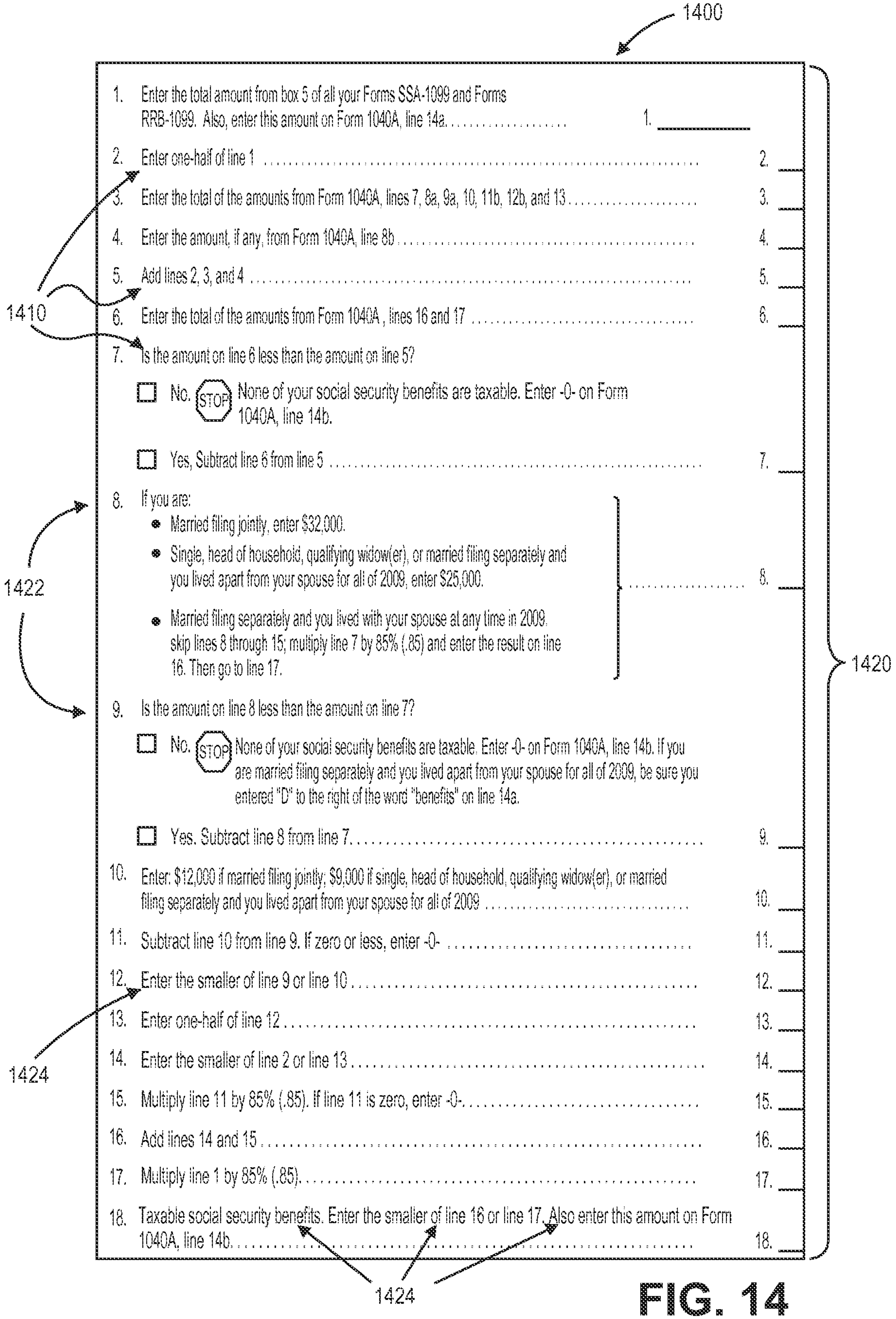
1. Enter the total amount from box 5 of all your Forms SSA-1099 and Forms RRB-1099. Also, enter this amount on Form 1040A, line 14a. . . . . . . . . . . . . . . . . . . 1. ______
2. Enter one-half of line 1 . . . . . . . . . . 2. ____
3. Enter the total of the amounts from Form 1040A, lines 7, 8a, 9a, 10, 11b, 12b, and 13 . . . . . . . . . . 3. ____
4. Enter the amount, if any, from Form 1040A, line 8b . . . . . . . . . . 4. ____
5. Add lines 2, 3, and 4 . . . . . . . . . . 5. ____
6. Enter the total of the amounts from Form 1040A , lines 16 and 17 . . . . . . . . . . 6. ____
7. Is the amount on line 6 less than the amount on line 5?
   - ☐ No. STOP None of your social security benefits are taxable. Enter -0- on Form 1040A, line 14b.
   - ☐ Yes, Subtract line 6 from line 5 . . . . . . . . . . 7. ____
8. If you are:
   - Married filing jointly, enter $32,000.
   - Single, head of household, qualifying widow(er), or married filing separately and you lived apart from your spouse for all of 2009, enter $25,000.
   - Married filing separately and you lived with your spouse at any time in 2009. skip lines 8 through 15; multiply line 7 by 85% (.85) and enter the result on line 16. Then go to line 17.

. . . . . . . . . . 8. ____
9. Is the amount on line 8 less than the amount on line 7?
   - ☐ No. STOP None of your social security benefits are taxable. Enter -0- on Form 1040A, line 14b. If you are married filing separately and you lived apart from your spouse for all of 2009, be sure you entered "D" to the right of the word "benefits" on line 14a.
   - ☐ Yes. Subtract line 8 from line 7. . . . . . . . . . . 9. ____
10. Enter: $12,000 if married filing jointly; $9,000 if single, head of household, qualifying widow(er), or married filing separately and you lived apart from your spouse for all of 2009 . . . . . . . . . . 10. ____
11. Subtract line 10 from line 9. If zero or less, enter -0- . . . . . . . . . . 11. ____
12. Enter the smaller of line 9 or line 10 . . . . . . . . . . 12. ____
13. Enter one-half of line 12 . . . . . . . . . . 13. ____
14. Enter the smaller of line 2 or line 13 . . . . . . . . . . 14. ____
15. Multiply line 11 by 85% (.85). If line 11 is zero, enter -0-. . . . . . . . . . . 15. ____
16. Add lines 14 and 15 . . . . . . . . . . 16. ____
17. Multiply line 1 by 85% (.85). . . . . . . . . . . 17. ____
18. Taxable social security benefits. Enter the smaller of line 16 or line 17. Also enter this amount on Form 1040A, line 14b. . . . . . . . . . . 18. ____

FIG. 14

METHODS SYSTEMS AND ARTICLES OF MANUFACTURE FOR GENERATING TAX WORKSHEET APPLICATION

SUMMARY

Embodiments relate to automatic generation of a program, instruction, executable code or an application (generally, "application") for a tax worksheet. Embodiments transform static tax worksheet data into an interactive tax worksheet application, which provides new levels of user interaction, abilities and convenience when working with worksheets and preparing tax returns. A worksheet application may be generated for each worksheet or for groups of worksheets such as multiple worksheets that are all related to a certain category or multiple worksheets that are all related to a category, such as deductions or investment income. Applications generated according to embodiments may also be utilized independently of a tax preparation application or embedded within a tax engine of the tax preparation application to provide further flexibility for access to and completing worksheets.

One embodiment is directed to a computer-implemented method for generating an interactive application of a worksheet utilized for preparation of a tax return and comprises receiving electronic data of the worksheet, e.g., electronic data of a worksheet received from or published by a tax authority or other source, and parsing the electronic data. The method further comprises generating an interactive worksheet application embodying one or more executable instructions based at least in part upon parsed electronic data.

A further embodiment is directed to a computer-implemented method for generating an interactive application of a worksheet and comprises receiving respective electronic data of respective worksheets from or published by a tax authority or other source and parsing respective electronic data. The method further comprises generating respective interactive worksheet applications embodying respective executable instructions based at least in part upon respective parsed electronic data. An interactive worksheet application is generated for each worksheet.

Another embodiment is directed to a computer-implemented method for generating an interactive application of a worksheet that comprises receiving respective electronic data of respective worksheets from or published by a tax authority or other source, and parsing respective electronic data. The method further comprises generating interactive worksheet applications embodying respective executable instructions for a plurality of worksheets based at least in part upon respective parsed electronic data of the plurality of worksheets. An interactive worksheet application is generated for multiple worksheets related to the same tax topic, e.g., worksheets related to investments, or worksheets related to deductions for business expenses. Thus, multiple worksheets can be accessed by executing a single application generated according to embodiments.

Yet another embodiment is directed to a computer-implemented method for generating an interactive application of a worksheet and comprises receiving data of an electronic publication including a worksheet in a Standard Generalized Markup Language (SGML) format. The method further comprises converting the SGML publication to another format such as an Extensible Markup Language (XML) format. The method further comprises extracting a worksheet from the publication in the other format, e.g., from the XML publication, and applying a rule, such as an extensible style sheet language transformation (ESLT) rule, to the XML worksheet. A result of application of the rule is generation of an XML input worksheet, which is parsed. The method further comprises generating an interactive worksheet application embodying an executable instruction based at least in part upon the parsed XML worksheet.

Further embodiments are directed to articles of manufacture or computer program products comprising a non-transitory, computer readable storage medium having instructions embodied within an application or program which, when executed by a computing apparatus, such as a computer or mobile communication device, cause the one or more processors to execute a process for implementing embodiments directed to automatic transformation a worksheet into an interactive worksheet application and generating an interactive application of a worksheet.

Yet additional embodiments are directed to systems configured or operable to execute embodiments or aspects thereof. A system may comprise a computing apparatus configured to execute certain embodiments. A system may also include or involve components including a pre-processor or converter, a parser that is configured to receive an output of the pre-processor or converter, a code generator configured to receive an output of the parser, and an interpreter configured to receive an output of the code generator, which may be in the form of a data flow graph. Thus, for example, the pre-processor or converter may receive raw worksheet data from a source such as a tax authority, convert, transform or clean the data for parsing. One example of a pre-processor or converter that may be utilized in embodiments is a SGML/XML converter, which may also convert related Document Type Definitions (DTDs). Systems may also involve or comprise, or the pre-processor or converter may utilize or comprise, a worksheet extractor, which selects a worksheet section of a publication. The parser is operable on a result generated by the pre-processor or converter such as a XML input worksheet to generate a relational representation or syntactic structure of the input worksheet data. The parser may be configured to perform parsing functions and generate an output in the form of, for example, a parse tree, typed relationship graph or other structure. The result or output of the parser is provided to a code generator, which reads parsed data to automatically generate code or instructions based on the parser output. The code or instructions are embodied in a worksheet application that can be executed or utilized independently of a tax preparation application or embedded within a tax preparation application or tax engine. Systems may involve worksheet applications executable on a computing apparatus in the form of a mobile communication device, or be part of a tax engine of a tax preparation program.

In a single or multiple embodiments, electronic data or a publication received from a source such as a tax authority is in a first format, and the electronic data or publication in the first format is converted into a different format, e.g., from Standard Generalized Markup Language (SGML) (together a Document Type Definition (DTD) that defines a structure a document using SGML) to Extensible Markup Language (XML). Thus, in contrast to known systems that convert a SGML publication into a Portable Document Format (PDF) document.

In a single or multiple embodiments, a rule such as an Extensible Stylesheet Language Transformation (XSLT) rule is applied to the converted electronic data or electronic data in the second format to generate a cleaned or reduced version of the electronic data for parsing. For example, the electronic data of an electronic publication including the worksheet in a first format is converted into a second format, a worksheet is extracted from electronic publication, a rule is applied to the extracted worksheet to select electronic data of the extracted worksheet, which is parsed and further processed.

In a single or multiple embodiments, the interactive worksheet application is executable independently of a tax preparation program utilized to prepare the tax return. For example, the application may execute on a mobile communication device such as a smartphone or tablet computing device, but in other embodiments, the application may be embedded within a tax engine of a tax preparation application so that executable instructions of worksheets can be automatically generated rather than having to utilize static or hardcopy versions.

In a single or multiple embodiments, a user executes or launches the interactive worksheet application, interacts with the application and provides input leading to generation of a result, which may be used to populate a line of one or more forms of the tax return.

In a single or multiple embodiments, when the application executes independently of a tax preparation application utilized to prepare the tax return, data or results of the worksheet may be transmitted or communicated to the tax preparation application, e.g., from the mobile communication device of the user.

In a single or multiple embodiments, the electronic data is parsed by generating a parse tree or typed dependency graph that represents electronic data, how it is structured, and how certain data relates to other data. Parsing may be applied to all available electronic data (e.g., after pre-processing and conversions), or based on certain pre-determined segments or considering certain pre-determined terms such as sentence segments and parsing individual terms that were previously determined to be included in worksheets as a result of comparison with previously extracted worksheet terms stored in a data store. For example, segmentation or term comparisons to be utilized during parsing may involve tax authority language patterns and key phrases In a single or multiple embodiments, parameters of the executable instruction(s) are based at least in part upon a result of parsing the electronic data. For example, methods may involve a stage during which data resulting from parsing is bound to operators and/or operands of an executable instruction.

In a single or multiple embodiments, a data flow graph embodying a representation of the executable instruction is generated and can be interpreted to identify the executable instruction or portions thereof. For example, the representation of an executable instruction is based at least in part upon binding data of respective data flow graph nodes and respective instruction parameters. Each node of the data flow graph can be associated with a row of the original worksheet, and a node may be associated with multiple sentences within a single row of the worksheet.

In a single or multiple embodiments, a classification being assigned to the executable instruction. Examples of a classification include user input, user notification and system. With a user input instruction, for example, the user may be prompted for input or a response, which is integrated into a corresponding section of the worksheet. For this purpose, the user instruction may also invoke appropriate audio and/or visual user interface components. As another example, an instruction may be classified as a user notification instruction that informs the user of an amount to be inserted by the user into a line of the tax return. The instruction may also be classified as a system instruction that performs a calculation. The application may detect when an instructions involves a user notification instruction and involves an amount or other data, and take that amount or other data and automatically populate the form of the tax return with the amount for the user.

BRIEF DESCRIPTION OF THE DRAWINGS

FIGS. 1-2 illustrate known tax worksheets utilized for a calculation involving capital gains and social security benefits;

FIG. 8 shows raw SGML data of a tax worksheet publication;

FIG. 14 illustrates a tax worksheet including highlighted sections that were processed according to embodiments to transform a tax worksheet into an interactive executable application with instructions for each tax worksheet row;

DETAILED DESCRIPTION OF ILLUSTRATED EMBODIMENTS

Figure 3:
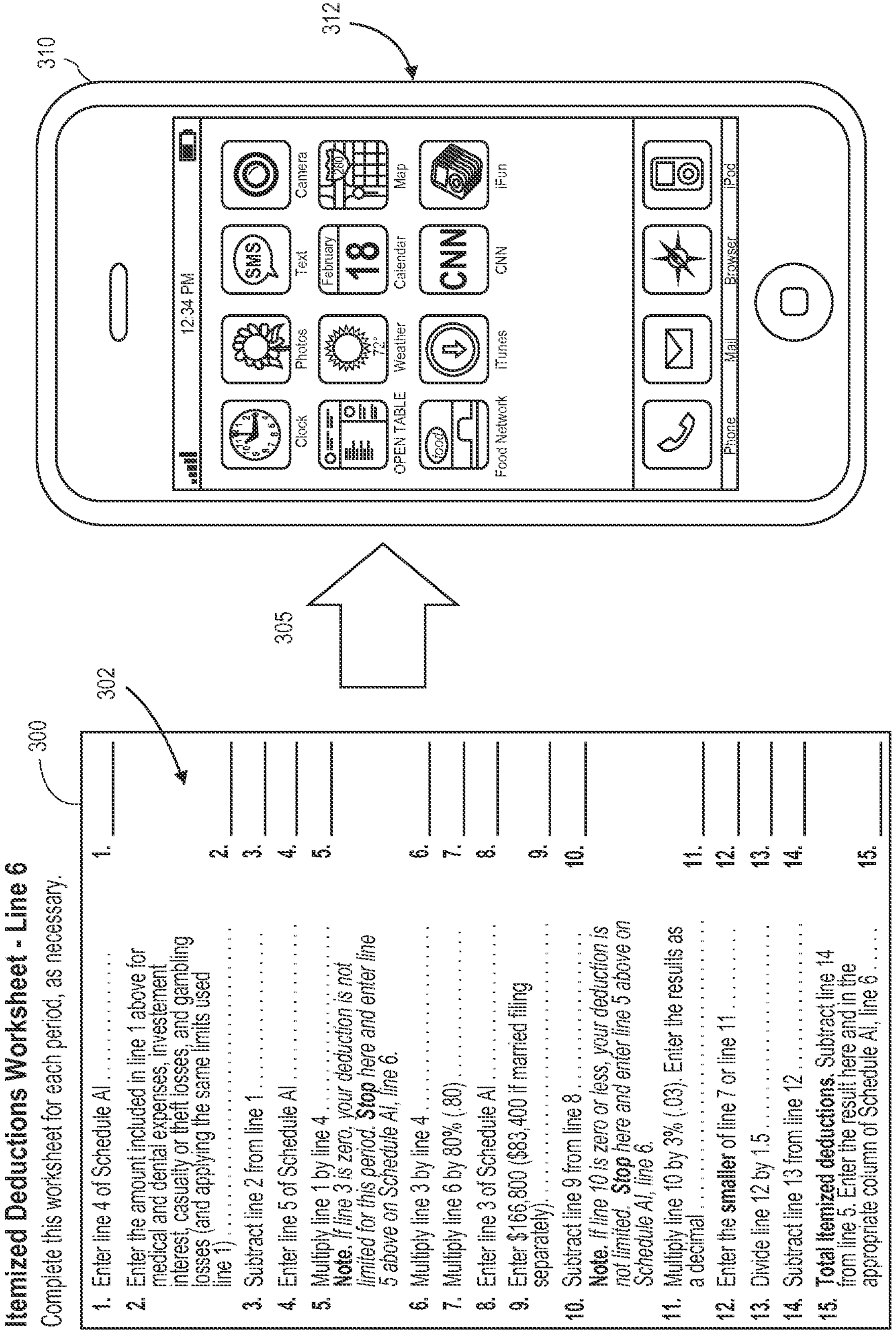
FIG. 3 illustrates embodiments transforming a tax worksheet into an interactive executable application.

Referring to FIGS. 1-3, embodiments are directed to transforming 305 data 302 of a tax worksheet 300 (e.g., as published by a tax authority such as the IRS, published examples 10, 12 of which are shown in FIGS. 1-2 for calculations involving capital gains and social security benefits, and other tax calculations such as deductions as shown in FIG. 3) by automatically generating code embodied within an interactive application 312. The interactive application 312 includes executable instructions that may execute on or be executed by a computing apparatus 310, such as a computer or a mobile communication device as shown in FIG. 3.

Embodiments provide for generation of an executable application 312 for navigating tax worksheets, entering worksheet data, and viewing calculation or other results. Further, since embodiments provide for automatic code generation embodying worksheet content and flow, it is not necessary for users or programmers to utilize static or hardcopy version of a tax worksheet. Embodiments may provide for worksheet applications 312 that can be executed independently of a tax preparation application and navigated, reviewed and populated independently of a tax return. Tax worksheet applications 312 or the automatically generated code therein may also be embodied within a tax engine of a tax preparation application, e.g., a tax preparation application available from Intuit Inc., Mountain View, Calif. Embodiments provide for automatic code generation by intelligently analyzing lower level attributes, content and associated workflow, paths, requirements and options embedded within worksheets with the result of an application 312 or program containing instructions that were automatically generated. Embodiments significantly reduce or eliminate work involving worksheets 300 and provide users with flexibility of when and how to review and utilize worksheets 300.

Figure 4:
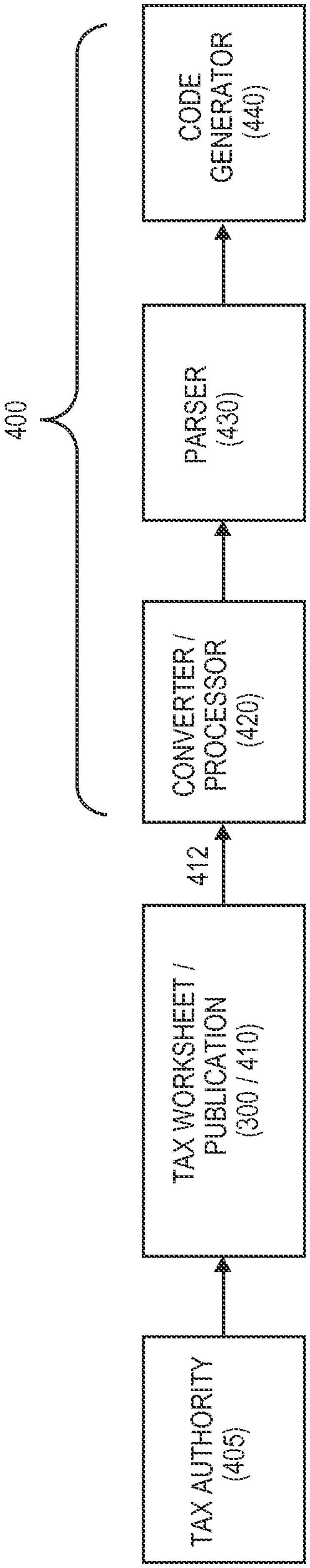
FIG. 4 is a block diagram of a system constructed according to one embodiment for transforming a tax worksheet into an interactive executable application.
Figure 5:
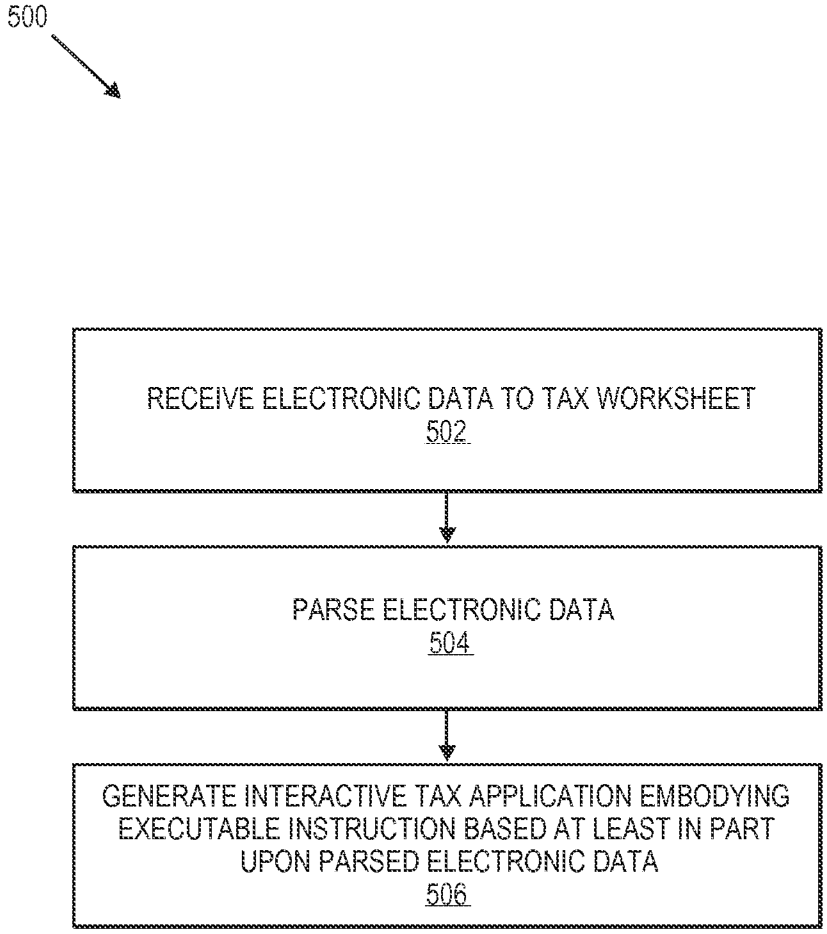
FIG. 5 is a flow diagram of a method for transforming a tax worksheet into an interactive executable application.

For example, referring to FIGS. 4-5, certain system 400 and method 500 embodiments comprise or involve, at 502, the system 400 or a computing apparatus (generally, system 400) receiving raw electronic worksheet data 412 (generally, electronic data 412) of a tax worksheet 300 from a tax authority 405 or other source, e.g., in the form of electronic data 412 of a tax worksheet publication 410, and preparing the electronic data 412 for parsing. For purposes of communication between computers or system 400 components (e.g., to receive electronic or publication data 412 from the tax authority 405), computers or components may be in communication with each other through a network such as wireless or cellular network, a Local Area Network (LAN) and/or a Wide Area Network (WAN), or combinations thereof.

With continuing reference to FIG. 4, the system 400 may include a converter or processor (referred to as pre-processer 420), which may reformat and clean the electronic data 412 in preparation for parsing. The output of the converter or pre-processor 420 is provided as an input to a parser 430, which segments the electronic data 412 or converted electronic data 412 into an output in the form of, for example, a tree or relational structure such as parse tree. The parser 430 breaks down or segments electronic data 412 into smaller terms or elements to aid in interpreting the meaning of the electronic data 412 and parsed terms thereof. The parser 430 output is provided to a code generator 430, which generates an interactive tax worksheet application 312 embodying one or more executable instructions at 506. The resulting instructions of the application 312 are derived, determined from or based at least in part upon a result of parsing the electronic data 412.

While FIG. 4 and other figures illustrate system components within a system flow diagram, it will be understood that such components may be part of a computing apparatus utilized or accessed by the preparer of an electronic tax return, or embodied within a tax preparation application utilized to prepare an electronic tax return. The computer hosting or accessing various system components may be a preparer computer such as a home or business computer utilized by the preparer who may be an individual preparing his or her own personal tax return or an accountant or a tax professional preparing a personal or corporate or business entity tax return.

Figure 6:
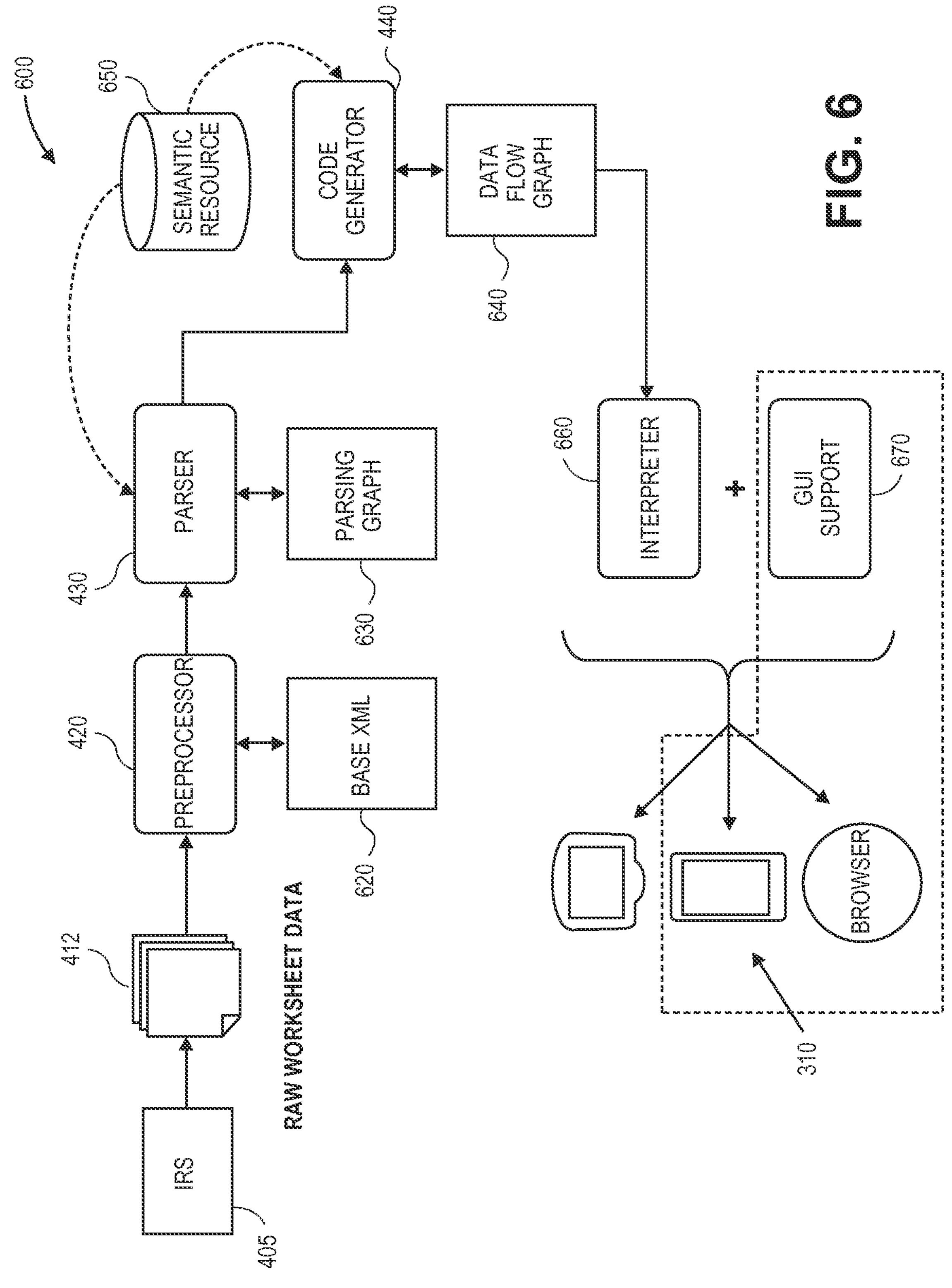
FIG. 6 is a system flow diagram further illustrating system components and how they are utilized in methods for transforming a tax worksheet into an interactive executable application.

Referring to FIG. 6, a more detailed system flow diagram illustrates how the automatic code generation method 600 is implemented. In the illustrated embodiment, electronic data 412 of the worksheet 410 is received from the tax authority 405 or other tax collecting entity or source in a data or file format utilized by the tax authority 405. Thus, the source of the electronic data 412 may be the tax authority 405 or an intermediary that receives or manages worksheets 300 and provides information to taxpayers and users of tax preparation applications operable to prepare and file tax returns. For ease of explanation, reference is made to the source 405, which may be a tax authority (as shown in FIG. 6), and the tax authority may be a federal, state or local tax authority or other tax collecting entity.

The electronic data 412 received from the source 405 is provided to the pre-processor 420. The pre-processor 420 functions to perform one or more initial organization, cleaning and conversion operations on the electronic data 412. For example, the pre-processor 420 may clean electronic data 412 and convert the electronic data 412 into a different format, perform preliminary element grouping, substitution, normalization and option identification of or related to the electronic data 412. The result or output 620 generated by the pre-processor 420 is a XML document ("Base XML" as shown in FIG. 6).

Figure 7:
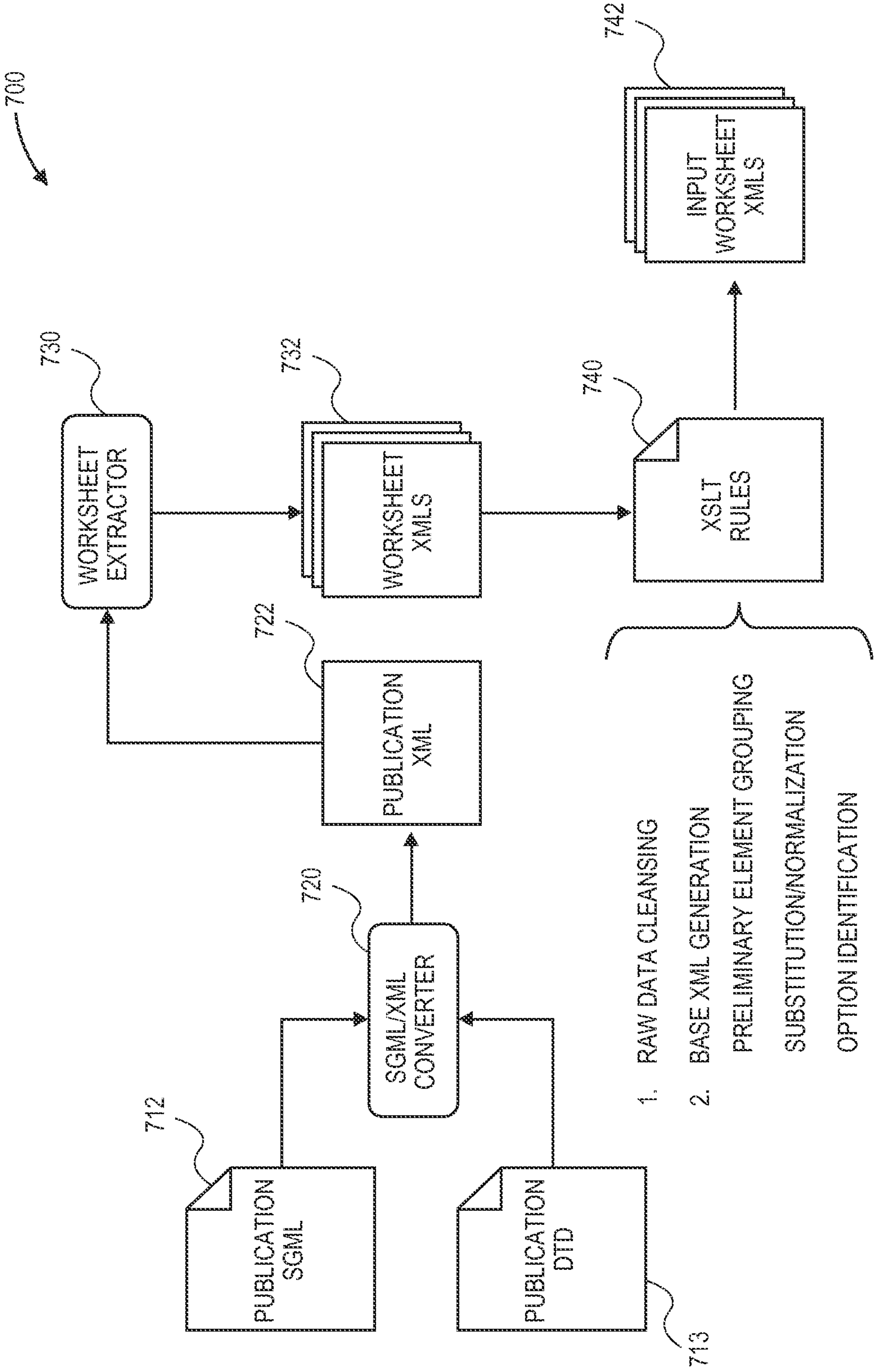
FIG. 7 is a system flow diagram further illustrating pre-processing of electronic worksheet data received from a source such as a tax authority being provided to a parser.

Referring to FIG. 7 and with further reference to FIG. 8, one example of how the raw electronic data 412/812 may be pre-processed for parsing 430 shown. As illustrated in FIG. 7, in one embodiment, the raw electronic data 412 is from a tax worksheet publication 712 having SGML data 812 or is a SGML publication 712. The SGML publication 712 and associated Document Type Definition (DTD) 713, which defines the structure of the SGML publication 712, is provided as an input to a converter 720. In the illustrated embodiment, the converter 720 is a SGML to Extensible Markup Language (XML) converter such that the output of the converter 720 is a XML version 722 ("Publication XML" as shown in FIG. 7) of the original SGML publication 712.

With continuing reference to FIG. 7, the publication in XML format 722 is provided as an input to an extractor 730. The extractor 730 functions to select or parse a worksheet portion 732 ("Worksheet XMLs") of the XML publication 722. In other words, the output of the extractor 730 is the worksheet within the original publication 712, in XML format in the illustrated embodiment.

The XML worksheet 732 is further processed according to one or more pre-determined rules 740. In the illustrated embodiment involving the XML worksheet 732, the rules 740 are Extensible Stylesheet Language Transformations (XSLT) rules. It will be understood that other rules 740 may be utilized depending on the conversions and formats utilized. At least one XSLT rule 740 is applied to the data within the XML worksheet 732 to perform one or more functions of cleansing, grouping, substitution, normalization and option identification functions of or related to the data to which the rule 740 is applied, generating a result in the form of a XML input worksheet 742 suitable input to the parser 430 ("Input Worksheet XMLs" as shown in FIG. 7).

Figure 9A:
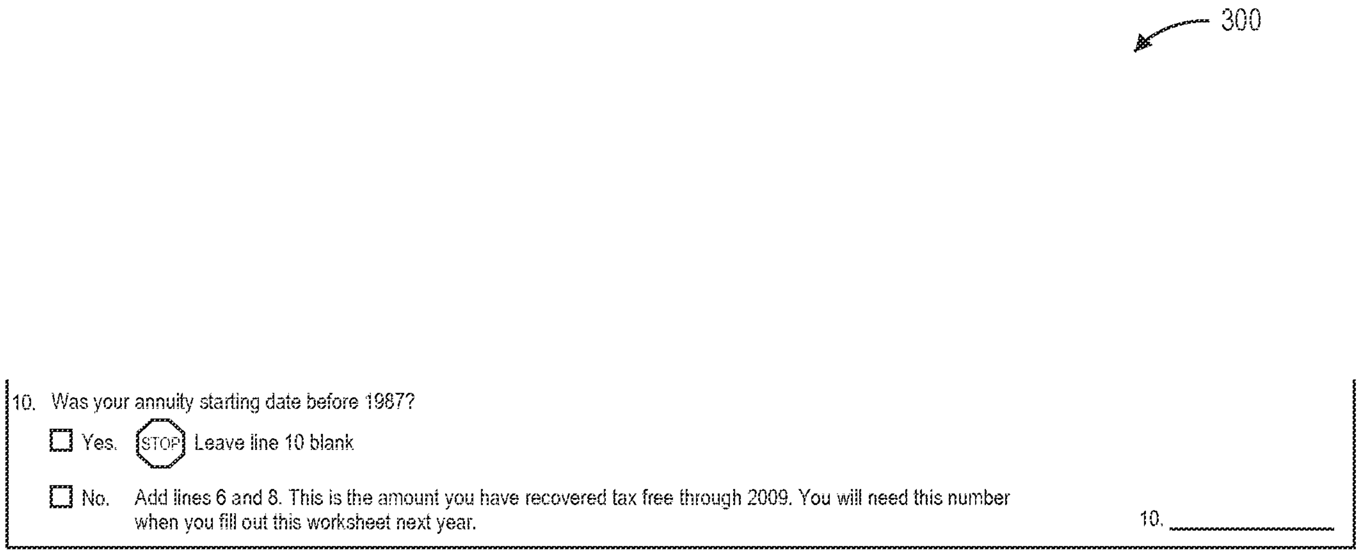
FIG. 9A illustrates an example of a tax worksheet that is pre-processed according to embodiments.
Figure 9B:
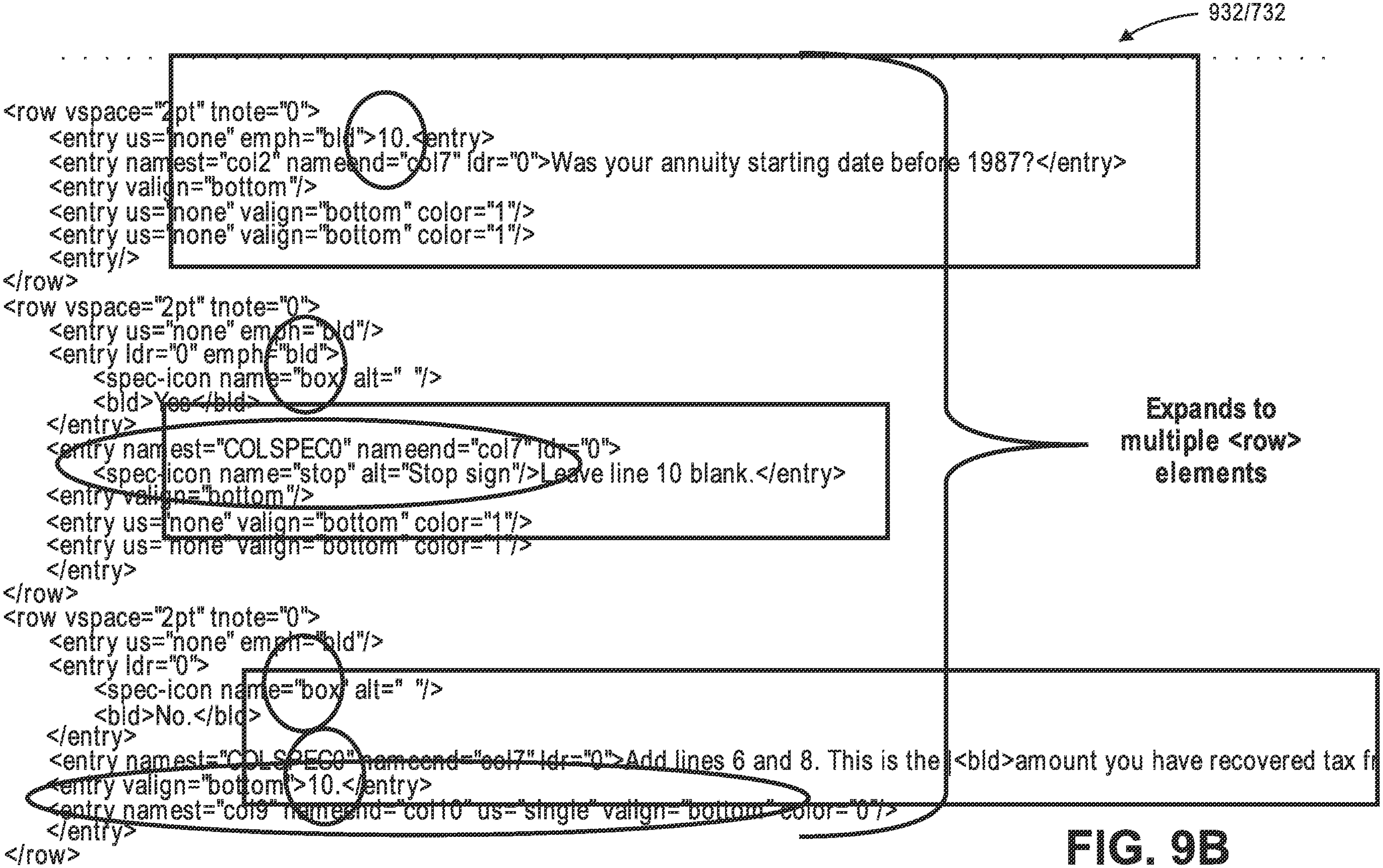
FIG. 9B illustrates a result of extraction of data from the example tax worksheet shown in FIG. 9A.
Figure 9C:
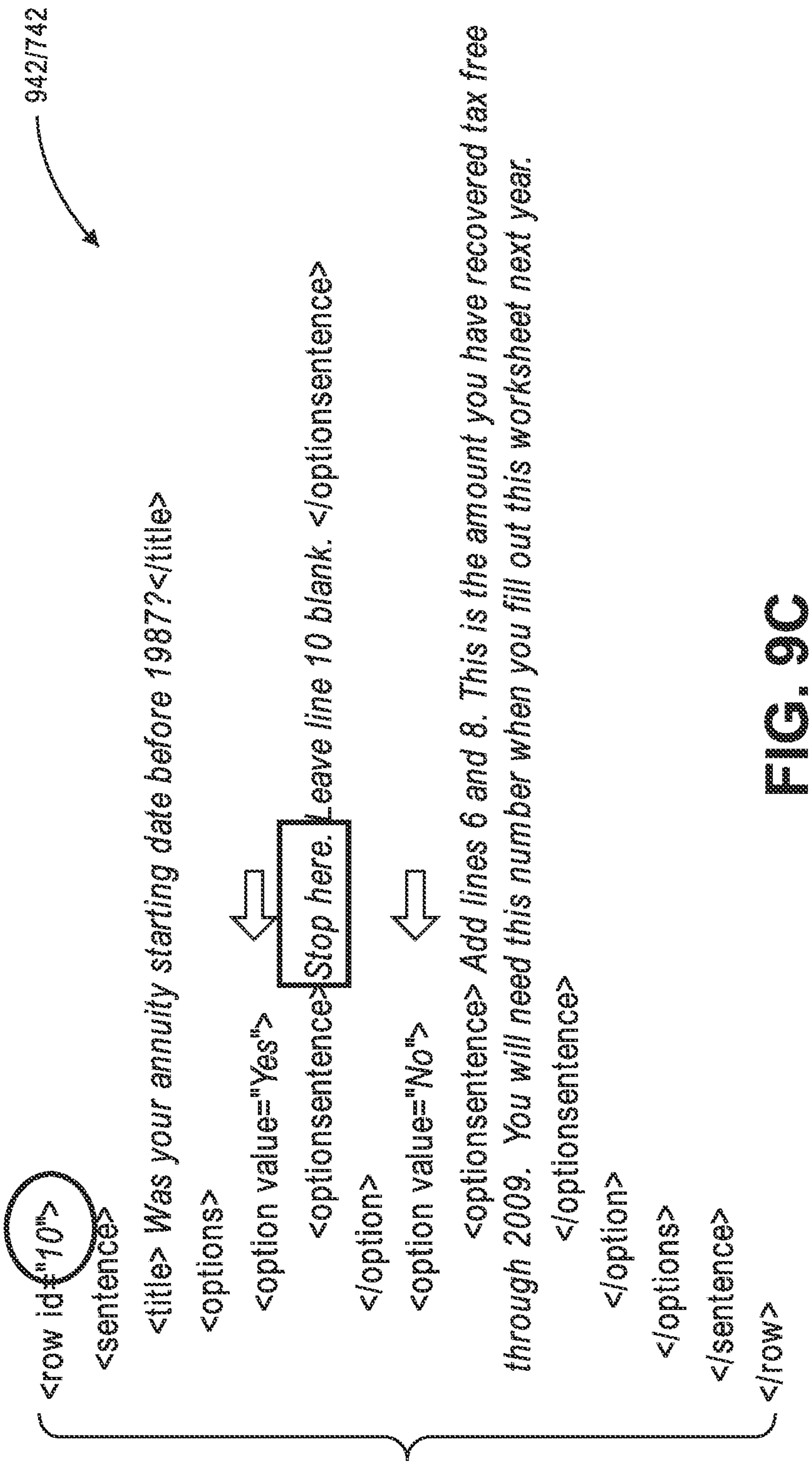
FIG. 9C illustrates a final, cleaned version of the data shown in FIG. 9B provided as an input to a parser.

For example, referring to FIGS. 9A-C, utilizing the illustrated example of a publication of a tax worksheet 300 to demonstrate how embodiments may be implemented, raw electronic data 412 in the form of SGML data 812 of the publication is converted and the resulting XML publication 722 is provided to the extractor 730. Referring to FIG. 9B, the extractor output 932 (XML worksheet 732) is illustrated, and FIG. 9C shows the result 942 (XML input worksheet 742) of applying XSLT rules 740 to that output 932. FIG. 9C further illustrates how rules 740 clean, condense and group SGML segments compared to the original SGML data in the XML worksheet 732.

FIGS. 6-9C illustrate one manner of performing pre-processing 420 involving SGML data, XML data, SGML to XML conversions, and XSLT rules. It will be understood that embodiments are not so limited and may involve other types or formats of publication, worksheet and input data, conversions and rules (if necessary). Accordingly, it will be understood that the processing and conversions described with reference to FIGS. 6-9C are provided as an illustrative examples of how pre-processing 420 can be performed according to embodiments.

Referring again to FIG. 6, the output of the pre-processor 420 is provided as an input to the parser 430. The parser 439 functions to generate an output in the form of, for example, a parsing graph, for analyzing the syntax, structure and meaning of data within the XML input worksheet 742 (with reference to a semantic resource 650) as needed for semantic parsing. Parser 430 functions may include, for example, one or more of segmentation of the input data (e.g., sentence segmentation), generation of a relational structure such as a parse tree or typed dependency graph, and named entity identification which may involve comparison of input terms with pre-determined tax worksheet terms to which parsing is applied or that impact how parsing is performed.

For example, the comparisons may involve tax authority language patterns within worksheets. In one embodiment, thousands of tax domain specific terms or phrases were extracted from various IRS publications. These terms or phrases can be utilized by the parser 430 and serve as the basis for terms or words to be selected by the parser 430, thus enhancing the accuracy of the parser 430 and providing meaningful parser 430 processing and results. The output of the parser 430 thus transforms an input by segmentation into nodes and connectors and by the addition of syntactic tags, thus illustrating the meaning, syntax, structure and relation of the input, with reference to the semantic resource 650 as necessary, to aid in parsing and how the resulting meaning is represented and conveyed.

Figure 10A:
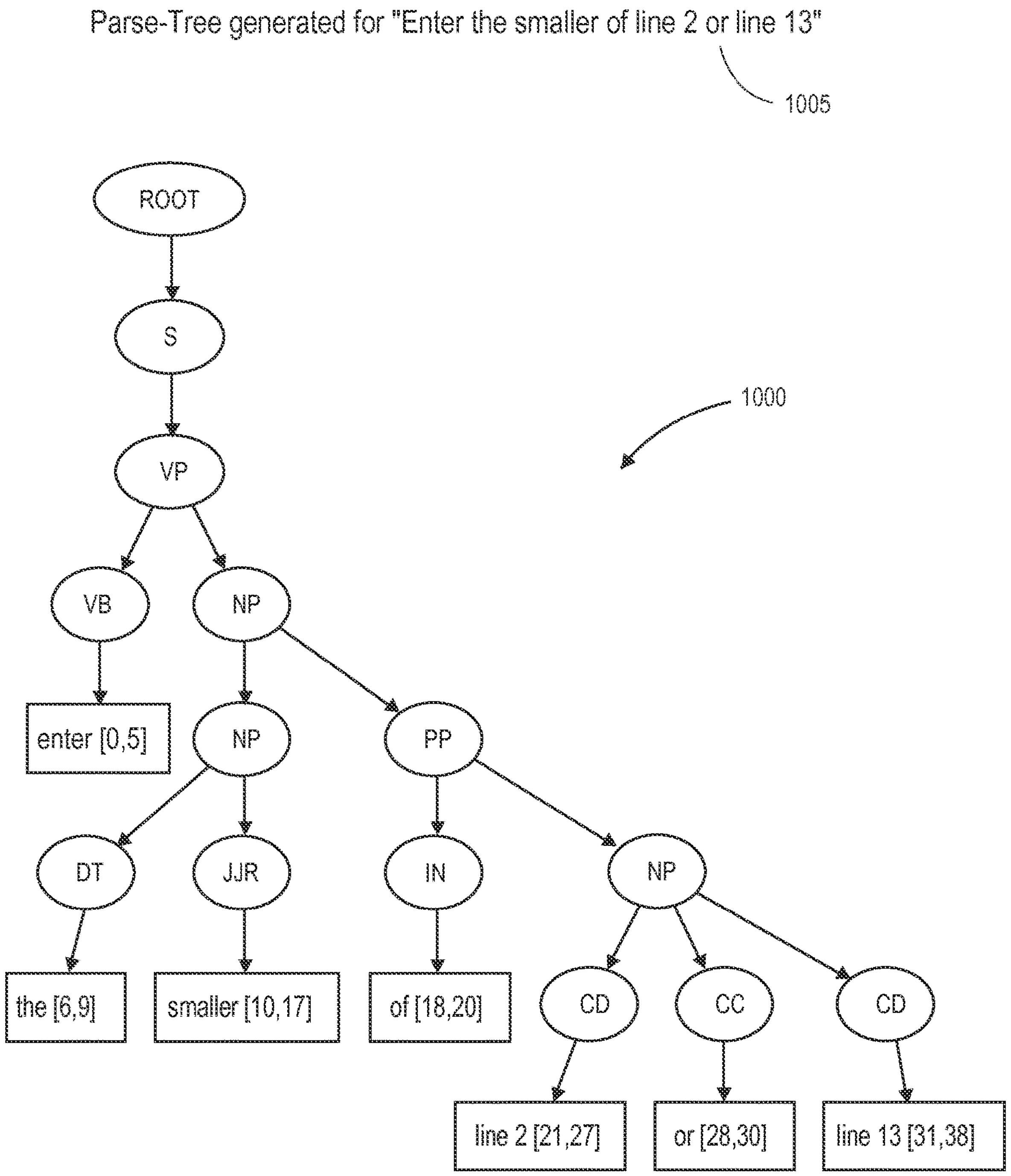
FIG. 10A illustrates an example of a parser output in the form of a parse tree and that may be utilized to represent a syntactic structure of the input worksheet data.
Figure 10B:
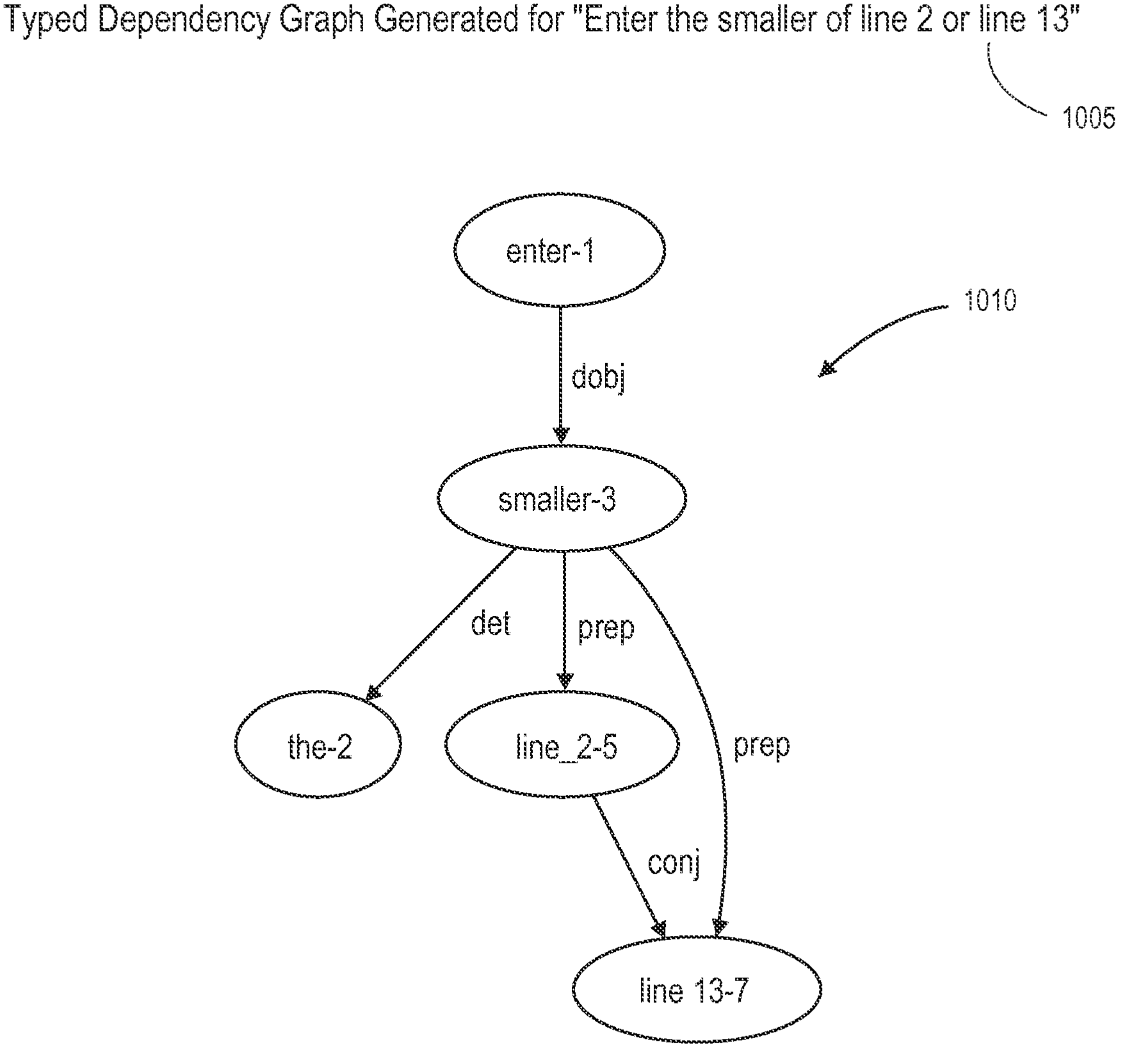
FIG. 10B illustrates an example of a parser output in the form of a typed dependency graph that may also be utilized to represent a syntactic structure of the input worksheet data.

FIGS. 10A-B illustrate examples of a parser 430 output resulting from an input of the XML input worksheet 742. Referring to FIG. 10A, according to one embodiment, the parser 430 output is in the form of a parse tree 1000. As shown in FIG. 10A, the parse tree 1000 shows how a sample tax worksheet instruction in the form of a natural language input 1005 "Enter the smaller of line 2 or line 13" input into the parser 430 is parsed to identify, for example, nodes for structures or segments including sentence (S), noun phrase (NP) which may be a subject or object, a verb phrase (VP), a verb (V), a preposition (PP), a noun (N), and so on for other syntactic tags of nodes that serve to illustrate the syntax, structure and meaning of the input 1005. The content is interspersed among various leaves of the parse tree 1000, with numerical data indicating a numerical position of a term within the original input 1005, with adjoining nodes above identifying different parts of the input 1005 and punctuation.

Referring to FIG. 10B, the same input 1005 is shown in FIG. 10A as being processed according to a different parsing procedure, resulting in a parser 430 output in the form of a typed dependency graph 1010. In the illustrated example in FIG. 10A, the same example input 1005 "Enter the smaller of line 2 or line 13" is parsed to define relationships between words and entities of the input 1005 for localized semantic analysis by separating key concepts and their modifiers, and to illustrate such relationships from a different parsing perspective. Further aspects about how typed dependency graphs 1010 as shown in FIG. 10B may be implemented are described in "Generating Typed Dependency Parses from Phase Structure Parses" by Marie-Catherine de Marneffe et al. and "Stanford typed dependencies manual" also by Marie-Catherine de Marneffe et al. (September 2008, revised for Stanford Parser v. 1.6.9 in September 2011), the entire contents of both of which are incorporated herein by reference as though set forth in full.

While FIGS. 10A-D illustrate how a parse tree 1000 and typed dependency graph 1010 can be generated based on one example of an input 1005, it will be understood that the same or similar parse tree 1000 and typed dependency graph 1010 analysis and processing can be applied to the parser 430 input in the form of the XML input worksheet 742 as shown in FIGS. 7 and 9C.

Referring again to FIGS. 4 and 6, having parsed the worksheet input 742, e.g., in XML format as described above, the output or result of parsing, such as the XML worksheet data being transformed into a representation of a parse tree 1000 or typed dependency graph 1010, is provided to the code generator 440. The code generator 440 is configured or operable to identify operators and control statements, identify or bind instruction operands or parameters, classify the instruction to indicate a level of user interaction, and generate a result or output in the form of a data flow graph, as described in further detail below.

Figure 11:
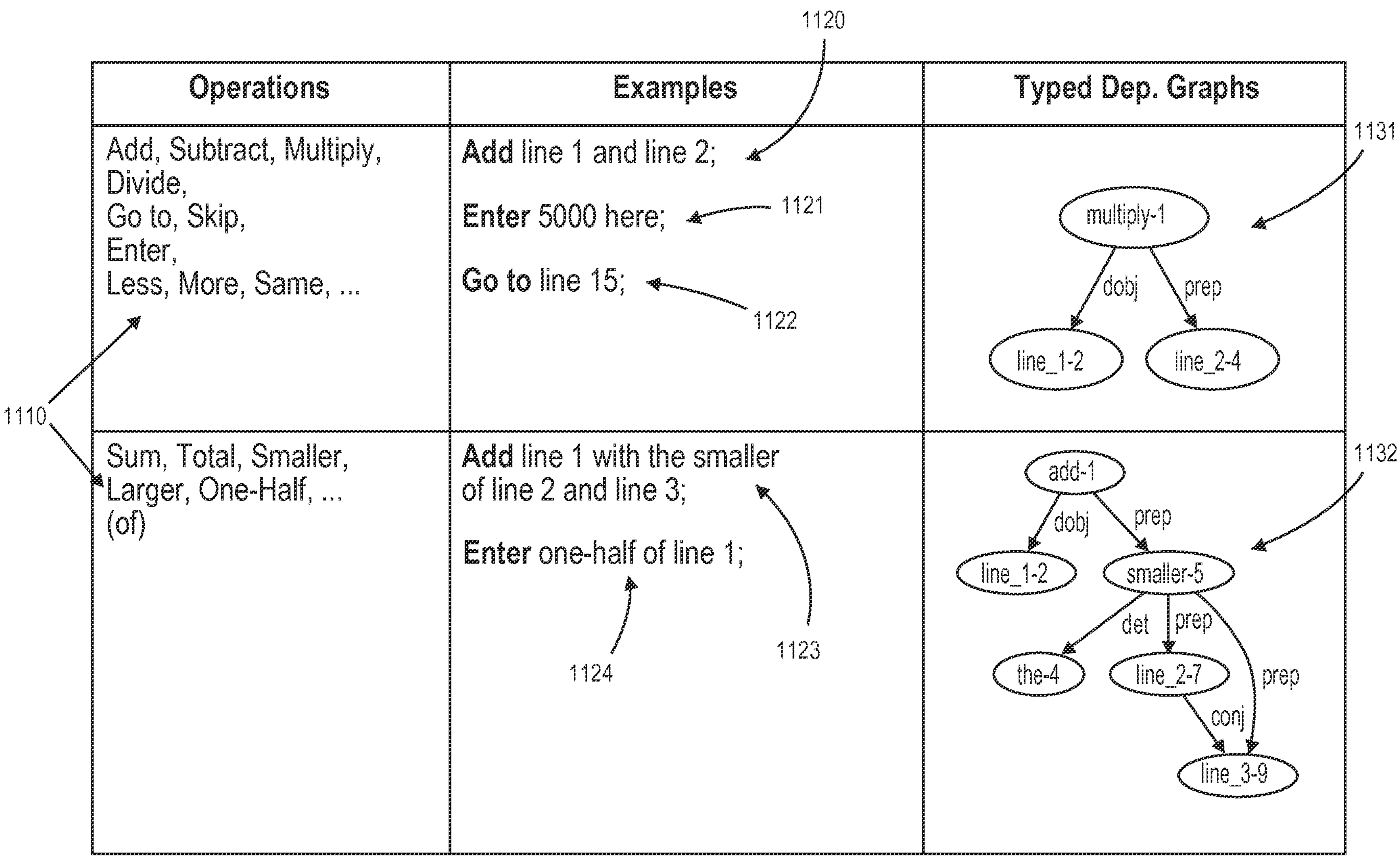
FIG. 11 is a table illustrating examples of operators utilized according to embodiments and how operators are expressed in a parser result such as a typed dependency graph.

Referring to FIG. 11, the code generator 440 identifies operators and control statements 1110 and control statements such as Add, Subtract, Multiply, Divide, Go To, Skip, Enter, Less, More, Same, Sum, Total, Smaller, Larger, One-Half, etc. FIG. 11 provides examples in which the parser 430 output or result is in the form of a typed dependency graph 1010 as described above, and provides examples of instructions and operators and control statements 1110 therein such as "Add" or "Multiply" a first line and a second line 1120; "Enter" a certain amount of an amount in a line 1121; "Go To" a specified line 1122; "Add" a first line and the "Smaller" of two other lines 1123 and "Enter" (a number) here or in this form or line" 1124.

FIG. 11 provides further examples of how such instructions and operators and control statements 1110 thereof, e.g., "Multiply" a first line and a second line and "Add" a first line and the "Smaller" of two other lines" can be represented in the form of typed dependency graphs 1131 and 1132.

More specifically, FIG. 11 illustrates how the XML input worksheet 742 is parsed with syntactic tags and nodes in a typed dependency graph 1131 to illustrate the syntax, structure, relation and meaning of that worksheet input 742 concerning a worksheet row or line instruction that two lines should be multiplied together, in which case the operator is "Multiply." FIG. 11 further shows how the XML input worksheet 742 is parsed with syntactic tags and nodes in a typed dependency graph 1132 to illustrate the syntax, structure, relation and meaning of the worksheet input concerning a worksheet row or line instruction that a line should be added with the smaller of two other lines, in which case the operator in this typed dependency graph is "Add." In these examples, the typed dependency graph involves a single operator at the root of the typed dependency graph, but it will be understood that embodiments may also involve operators at other nodes or multiple operators at different levels of the typed dependency graph. It will be understood that FIG. 11 and the operations and typed dependency graphs illustrated therein are provided as examples of how to implement embodiments and how instructions containing an operator may be parsed and expressed as a typed dependency graph, parse tree, or other parsed output.

Figure 12A:
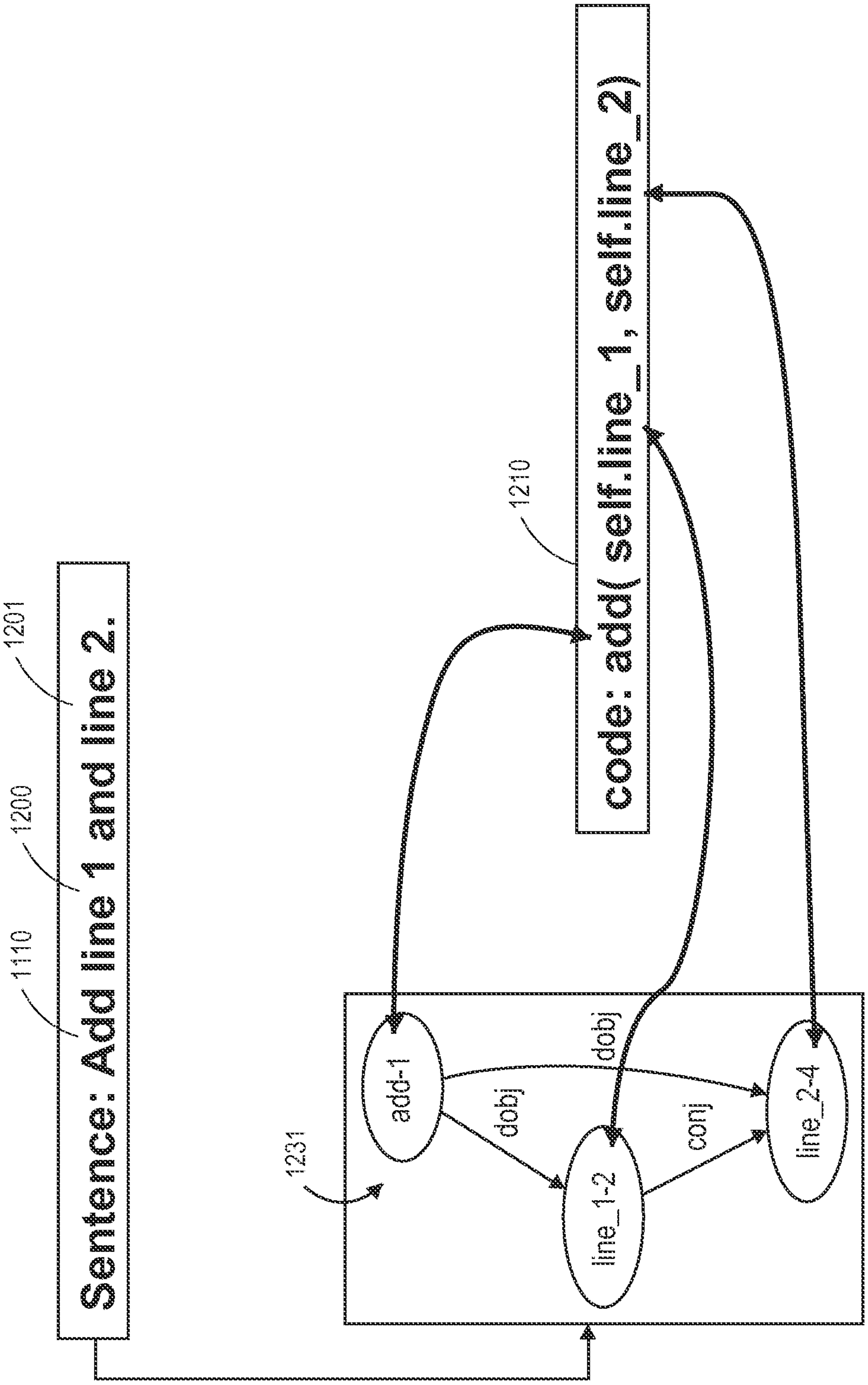
FIGS. 12A-C illustrate examples of binding or associating operands or parameters with operators shown in FIG. 11.
Figure 12B:
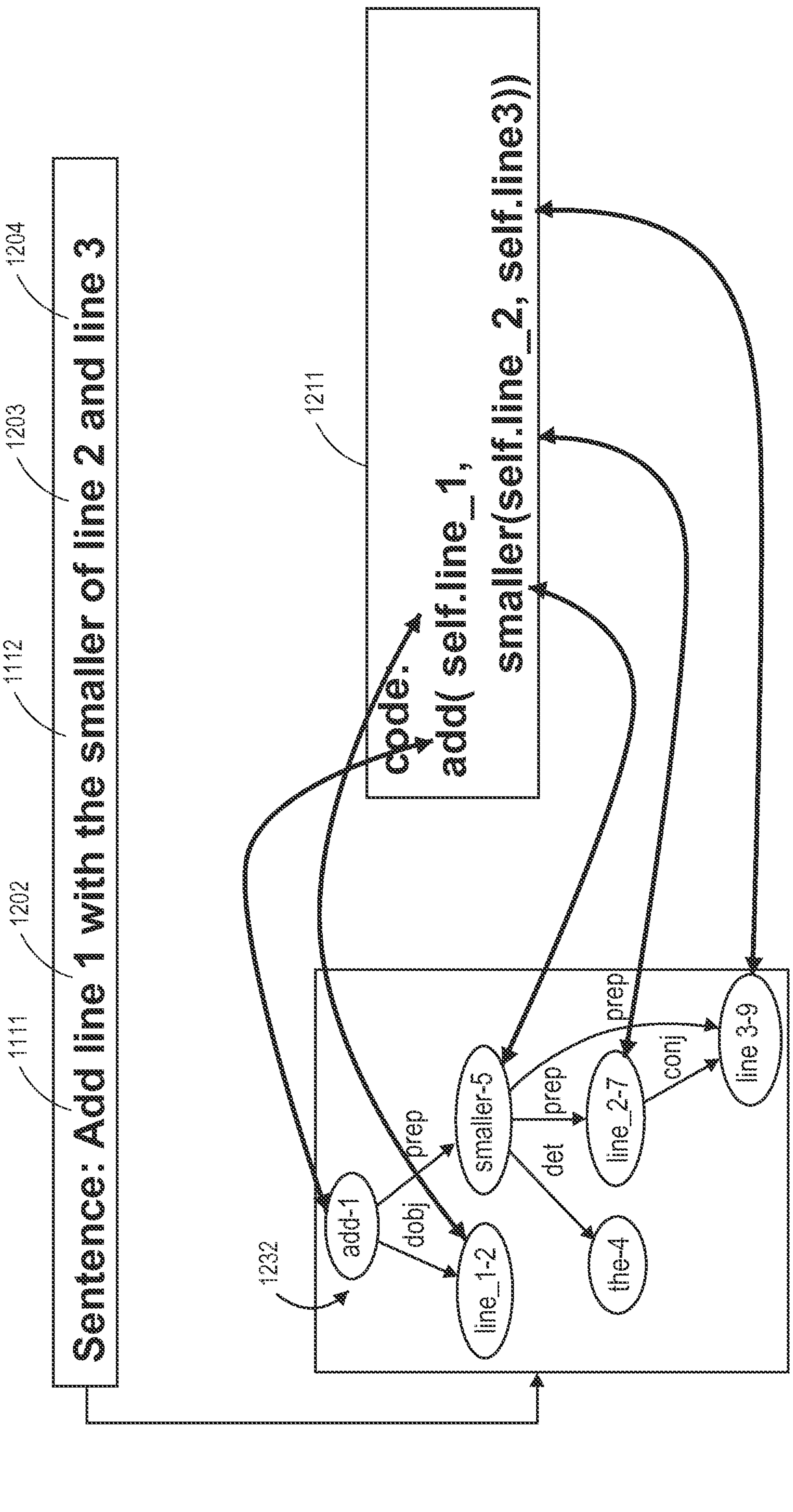
Figure 12C:
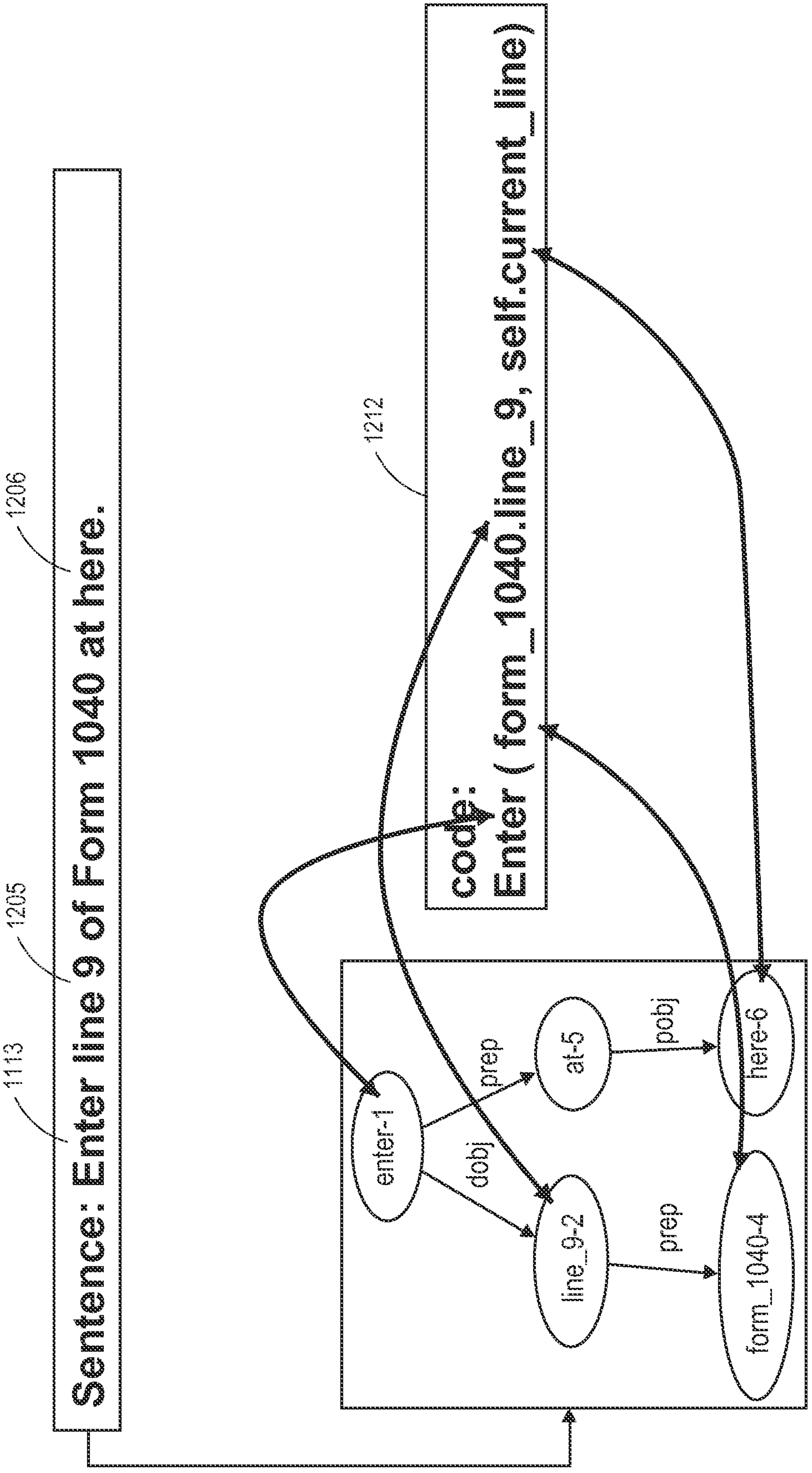

FIGS. 12A-C illustrate examples of how the code generator 440 binds operands or parameters 1200 with an identified operator 1110.

Referring to FIG. 12A, the typed dependency graph 1231 represents a sentence "Add Line 2 and Line 2" in which case the operator 1110 "Add" is identified, and the code generator 440 binds operands or parameters "Line 1" 1200 and "Line 2" 1201 to that identified operator 1110, resulting in a code segment 1210: "Add (self.line_1, self.line_2)."

Referring to FIG. 12B, the typed dependency graph 1232 represents a sentence "Add Line 1 with the smaller of Line 2 and Line 3" in which case the operators "Add" 1111 and "Smaller" 1112 are identified, and the code generator 440 binds operands or parameters "Line 1" 1202 to the "Add" operator 1111 and binds "Line 2" 1203 and "Line 3" 1204 to the "Smaller" operator 1112 resulting in a code segment 1211: "Add(self.line_1, Smaller (self.line_2, self.line3))."

Referring to FIG. 12C, the typed dependency graph 1233 represents a sentence "Enter line 9 of Form 1040at 'here'" in which case the operator "Enter" 1113 is identified, and the code generator 440 binds operands or parameters "Line 9" 1205 of Form 1040and "here" 1206 (current line) to the "Enter" operator resulting in a code segment 1212: "Enter (form_1040.line_9, self.current_line)."

It will be understood that various code segments may be generated and may include other types, numbers and combinations of operators and operands or parameters. Thus, FIGS. 11-12C are provided as examples of how operators may be identified, examples of binding operands or parameters, and examples of resulting generated code segments corresponding to that input or typed dependency graph.

Referring again to FIG. 6, the code generator 440 also classifies, assigns a classification to, or associates a classification with the input sentence or instruction for communications with a graphical user interface (GUI) 670 in connection with prompting the user for input or response or for communicating notifications to the user. According to one embodiment, a sentence or instruction is classified as a "user input," which prompts a user for input or a response, a "user notification," which displays or otherwise communicates a message to the user, or a "system" instruction, which does not involve user interaction or notification, and instead involves a system level function such as a calculation or comparison of amounts.

An example of a "user input" instruction is "Was your annuity starting date before 1987?" in which case the user would respond with "Yes/No." Another example of a "user input" instruction is an instruction that prompts the user to select from multiple options such as "If you are married filing jointly, single, widowed, divorced. . . ." A further example of a "user input" instruction calls for the user to lookup data in a form or line of the tax return and enter that external data into a line of the tax worksheet, such as "Enter the total of form 1040, lines 1 and 2 at line. . . . "

"User notification" instructions may involve a claim or statement concerning a tax situation of the user, or to indicate a follow-up action to be performed by the user, e.g., with regard to a different tax form. For example, a "user notification" instruction that makes a claim, conclusion or statement about the user's tax situation may be "None of your social security benefits are taxable" whereas a "user notification" instruction that informs the user of a follow-up action may be "Enter '0' on Form 1040A, line 12."

"System" instructions do not require user interaction or notification and instead may involve one or multiple operations, a compound instruction or a conditional instruction. An example of a single operation system instruction is "Multiply line 1 and line 2." An example of a multi-operation (e.g., double operation) system instruction is "Add line 1 with the smaller of line 2 and line 3." An example of a compound system instruction is "Multiply line 1 by 85% and enter the result on line 10." An example of a "conditional" system instruction is "If zero or less, enter 0."

Figure 13:
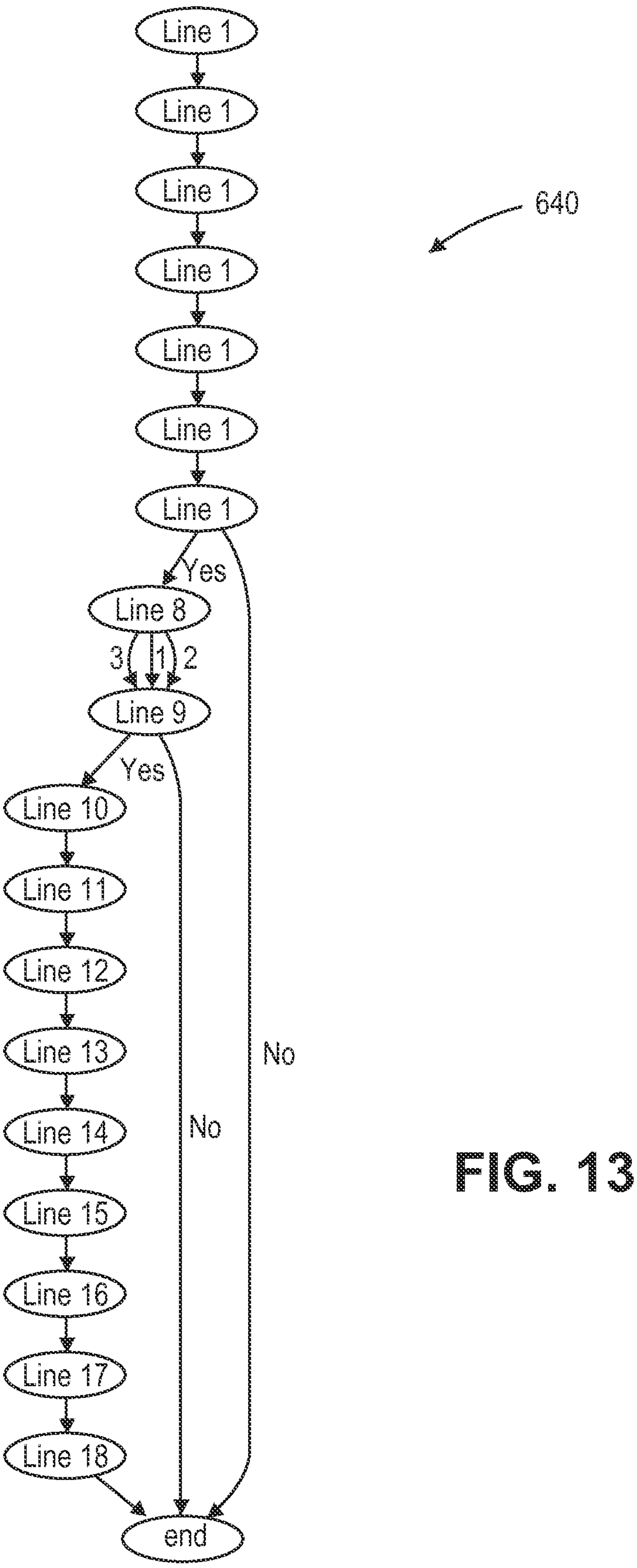
FIG. 13 illustrates an example of a result or output of a code generator in the form of a data flow graph that is consumed by a run-time interpreter to fetch generated code to be executed.

With continuing reference to FIG. 6 and with further reference to FIG. 13, in the illustrated the result or output generated by the code generator 440 is a data flow graph 640. The data flow graph 640 is structured and represents a workflow such that each node in the data flow graph 640 represents an instruction row of the original tax worksheet 300.

FIG. 13 illustrates an example of how a data flow graph 640 is generally structured, and the illustrated segment begins with "Line 1" and proceeds through various nodes and connectors such as "Skip" a node, "Go To" an identified node, "Stop" the process, an "Option," a node involving a "Yes/No" decision, or a "Default—fall through" until the final node in the data flow graph is analyze, e.g., node for Line 18 as shown in FIG. 13, and the process reaches End. Thus, FIG. 13 is provided as a general example of how the data flow graph 640 is structured, and it will be understood that the data flow graph 640 generated for a tax worksheet or portion thereof maybe larger and more involved depending on the tax worksheet content and number of instructions.

Referring again to FIG. 6, a result of compiling the data flow graph 640 is provided as an input to a run-time interpreter 660, which begins execution of the data flow graph 640 from the root, working its way down the data flow graph 640 nodes in turn. For each node, the interpreter 660, fetches the current instruction row of the tax worksheet, retrieves the generated code (as described with reference to FIGS. 12A-C) for that row, resolves operands as necessary with reference to a symbol or other reference table, and executes the generated code as retrieved. Depending on how the retrieved generated code is classified, execution of the generated code may involve prompting the user for input, data or a decision, notifying the user, or a system calculation or determination. The symbol or other reference table may be updated as appropriate with results of executing the generated code. Processing by the interpreter 660 continues down the data flow graph 640, processing the next node/row/generated instruction, until a final execution is completed.

Figure 15:
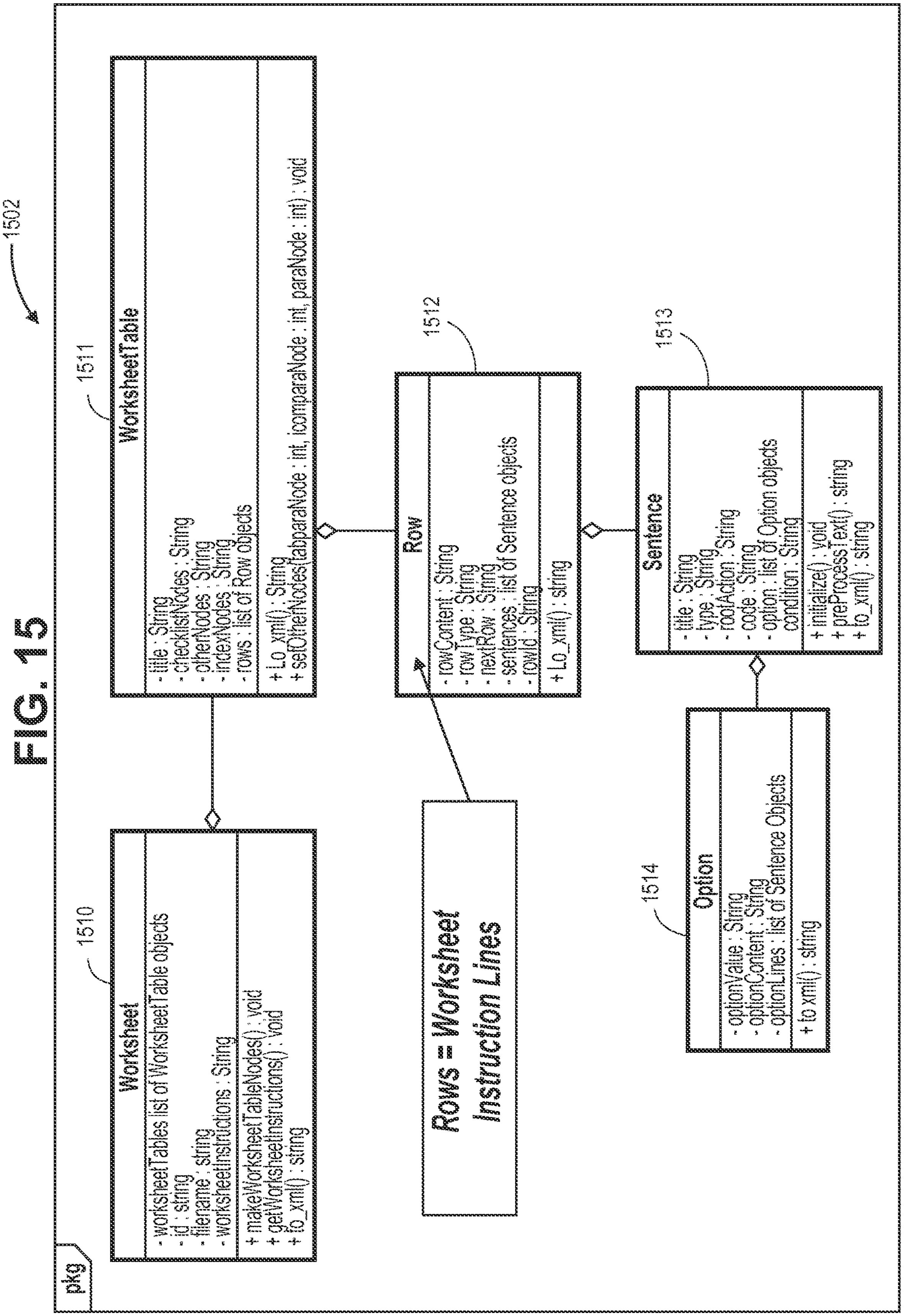
FIG. 15 illustrates an example of associated run-time data structures for transforming a tax worksheet into an interactive executable tax worksheet application.

FIG. 14 is an example of a tax worksheet 1400 (Taxable Social Security Benefit Worksheet) utilized for Form 1040A, Line 14A, 14B, illustrated with highlighted sections 1410 (sections or lines of rows 2, 5, 7, 9 and 11-18) to which embodiments were applied to automatically generate code or executable instructions for those instruction rows. FIG. 14 generally illustrates how the worksheet 1400 is structured to include a worksheet table 1420, the worksheet table including rows 1422 or worksheet instruction lines, each row including one or multiple sentences and associated options. For example, row or instruction line 12 includes one sentence 1424, whereas row or instruction line 18 at the bottom of the worksheet includes three separate sentences 1424. Embodiments were executed to generate code or instructions classified as "user input" instructions (e.g., user's Yes/No decision or input in Row 9 and "multiple options" in Row 8), and operations including control statements (e.g., Go To, Skip, Stop). Further, embodiments were executed to generate code or instructions for rows having a single sentence and rows having multiple sentences (such as line or row 18, and FIG. 15 illustrates an example of run time data 1502 generated for automatic code generation from a tax worksheet, and further illustrates run time data for the worksheet 1510, a table 1511 of the worksheet, a row 1512 of the worksheet or of a table, a sentence 1513 of a row, and options 1514 within a row or sentence.

The attached Appendix illustrates results and data generated from a live session demonstrating operation of embodiments involving a test XMLs input worksheet and resulting automatic code generation according to embodiments utilizing a parser function to generate a typed dependency graph.

Figure 16:
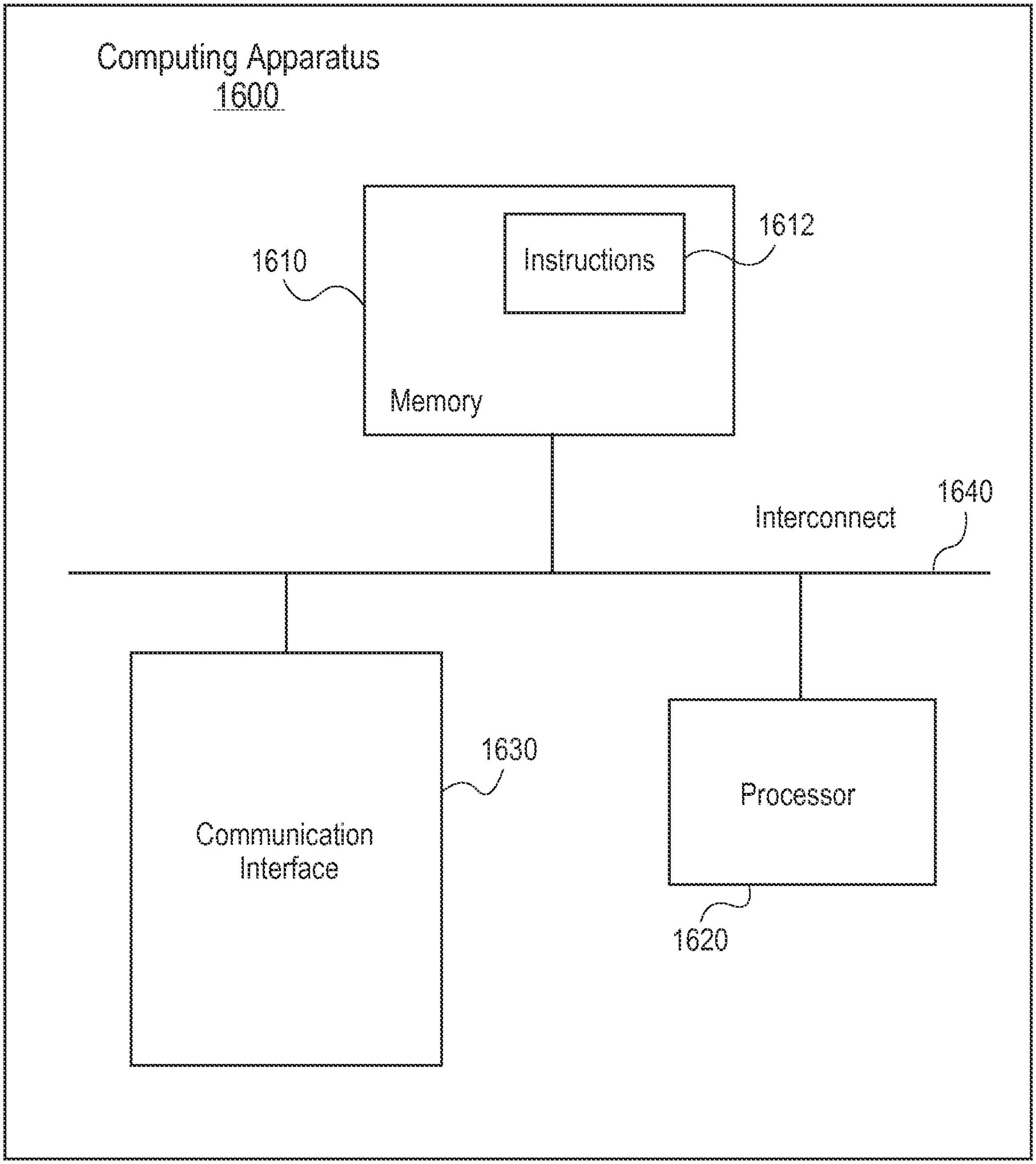
FIG. 16 is a block diagram of components of a computing apparatus or system in which various embodiments may be implemented or that may be utilized to execute various embodiments.

FIG. 16 generally illustrates components of a computing device 1600 that may be utilized to execute embodiments and that includes a memory 1610, account processing program instructions 1612, a processor or controller 1620 to execute account processing program instructions 1612, a network or communications interface 1630, e.g., for communications with a network or interconnect 1640 between such components. The memory 1610 may be or include one or more of cache, RAM, ROM, SRAM, DRAM, RDRAM, EEPROM and other types of volatile or non-volatile memory capable of storing data. The processor unit 1620 may be or include multiple processors, a single threaded processor, a multi-threaded processor, a multi-core processor, or other type of processor capable of processing data. Depending on the particular system component (e.g., whether the component is a computer or a hand held mobile communications device), the interconnect 1640 may include a system bus, LDT, PCI, ISA, or other types of buses, and the communications or network interface may, for example, be an Ethernet interface, a Frame Relay interface, or other interface. The network interface 1630 may be configured to enable a system component to communicate with other system components across a network which may be a wireless or various other networks. It should be noted that one or more components of computing device 1600 may be located remotely and accessed via a network. Accordingly, the system configuration provided in FIG. 16 is provided to generally illustrate how embodiments may be configured and implemented.

Method embodiments may also be embodied in, or readable from, a computer-readable medium or carrier, e.g., one or more of the fixed and/or removable data storage data devices and/or data communications devices connected to a computer. Carriers may be, for example, magnetic storage medium, optical storage medium and magneto-optical storage medium. Examples of carriers include, but are not limited to, a floppy diskette, a memory stick or a flash drive, CD-R, CD-RW, CD-ROM, DVD-R, DVD-RW, or other carrier now known or later developed capable of storing data. The processor 1620 performs steps or executes program instructions 1612 within memory 1610 and/or embodied on the carrier to implement method embodiments.

Although particular embodiments have been shown and described, it should be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims.

For example, while certain embodiments described above involve SGML to XML conversions before parsing, it will be understood that embodiments may involve other conversions in preparation for parsing, or that no conversion may be required before parsing. Further, while certain parsing results have been described with reference to parse trees and dependent type graphs, it will be understood that other parsing methods may be utilized to generate a parsing graph for analyzing the syntax, structure and meaning of data within the an input worksheet.

Further, embodiments may be implemented independently or separate of a tax preparation application, e.g., a native or downloadable application, or a web application, executable on or accessible by a mobile communication device or other computing apparatus, can be created for individual worksheets. In other embodiments, an application is created for multiple worksheets, e.g., based on category or type. Thus, for example, a single application may be created for multiple worksheets related to investments, whereas another application is created for multiple worksheets related to business deductions.

Further, while embodiments are described with reference to worksheets, embodiments may be applied to other tax forms (e.g., Form 1040) and documents.

Moreover, embodiments may be applied to tax authority compliance rules such as rules utilized to validate tax returns or determine if a tax return package satisfies applicable compliance requirements or analyzing why a tax authority rejected an electronically filed tax return. Thus, embodiments may be utilized during preparation or for post-filing analysis.

Embodiments may also be utilized in for other structured or logic documents for use in other work flow applications such as user manuals, e.g., manuals with instructions on how to set up accounts or how to create a direction list using an on-line map.

Where methods and steps described above indicate certain events occurring in certain order, those of ordinary skill in the art having the benefit of this disclosure would recognize that the ordering of certain steps may be modified and that such modifications are in accordance with the variations of the invention. Additionally, certain of the steps may be performed concurrently in a parallel process when possible, as well as performed sequentially. Thus, the particular sequence of method steps is not intended to be limiting and is provided for ease of explanation. For example, upon entry of the first quantifiable numeric tax return data utilized in a tax calculation, statistics related to that data may be retrieved in response to entry of the first data or later upon entry of second data to be analyzed.

Accordingly, embodiments are intended to exemplify alternatives, modifications, and equivalents that may fall within the scope of the claims.

What is claimed is:

1. A computer-implemented method comprising:

a pre-parsing processor comprising computer-executable instructions stored in a data store and executed by a processor of a computing apparatus, receiving, through a network, data of an electronic publication in a first format comprising Standard Generalized Markup Language (SGML) format and including a static worksheet, wherein the static worksheet is not executable by the computing apparatus;

the computing apparatus, by the processor executing the pre-parsing processor, converting the electronic publication data from the SGML format to a second format comprising an Extensible Markup Language (XML) format;

the computing apparatus by the processor executing the pre-parsing processor, extracting the static worksheet from the electronic publication in the XML format;

the computing apparatus, by the processor executing the pre-parsing processor, applying an extensible stylesheet language transformation (ESLT) rule to the electronic publication in the XML format to generate an XML input worksheet;

a parser comprising computer-executable instructions stored in the data store and executed by the processor of the computing apparatus and in communication with the preparsing processor, receiving the XML input worksheet generated by the pre-parsing processor and parsing the XML input worksheet;

a code generator comprising computer-executable instructions stored in the data store and executed by the processor of the computing apparatus and in communication with the parser, receiving the parsed XML input worksheet from the parser, and automatically generating an interactive, computer executable worksheet application embodying an instruction based at least in part upon the parsed XML input worksheet and executed by the processor of the computing apparatus, the computing apparatus, by the processor, executing the instruction of the computer executable worksheet application;

the computing apparatus presenting a user interface of the computer executable worksheet application to a user of the computing apparatus through a display of the computing apparatus based at least in part upon executing the instruction; and the computing apparatus receiving user input generated by user interaction with the generated user interface.

2. The method of claim 1, wherein the second format is not a portable document format (pdf) file format.

3. The method of claim 1, the pre-parsing processor applying a rule to the electronic publication data in the second format comprising the XML format to generate a cleaned or reduced version of the XML input worksheet for the parser.

4. The method of claim 1, further comprising the processor of the computing apparatus executing the at least one instruction of the generated interactive tax worksheet application to determine an amount of a line of a tax return, wherein the static worksheet is not part of the tax return.

5. The method of claim 1, wherein the static worksheet is a tax worksheet that is not required by the tax authority to be included in a completed tax return filed with the tax authority.

6. The method of claim 1, wherein the generated interactive tax worksheet application is executed by the processor of the computing apparatus comprising a mobile communication device.

7. The method of claim 1, wherein generation and execution of the interactive worksheet application are independent of a computerized tax preparation program utilized to prepare an electronic tax return.

8. The method of claim 1, further comprising the computing apparatus:

determining a worksheet result based at least in part upon the received user input; and presenting the worksheet result through the displayed generated interactive worksheet application.

9. The method of claim 8, further comprising the computing apparatus populating a line of an electronic tax return with the worksheet result.

10. The method of claim 8, further comprising the computing apparatus communicating the worksheet result to a computerized tax preparation application utilized to prepare an electronic tax return.

11. The method of claim 1, the parser output comprising a parse tree representing the electronic data.

12. The method of claim 1, the parser output comprising generating a typed dependency graph representing the electronic data.

13. The method of claim 1, parsing the electronic tax worksheet data in the second format comprising segmenting the electronic data in the second format into sentences, wherein segmented sentences are parsed.

14. The method of claim 1, further comprising:

comparing terms in the electronic data in the second format with terms in a data store; and determining whether any tax terms in the electronic data tax term based at least in part upon the comparison, parsing being based at least in part upon a term matching a term.

15. The method of claim 14, further comprising:

identifying the terms by extracting terms from a plurality of worksheet publications generated by the electronic source; and storing extracted terms to the data store.

16. The method of claim 1, the code generator generating a data flow graph embodying a representation of the executable instruction, further comprising a runtime interpreter receiving the data flow graph as an input and identifying the executable instruction based at least in part upon the data flow graph.

17. The method of claim 16, the representation being generated based at least in part upon binding data of respective data flow graph nodes and respective instruction parameters.

18. The method of claim 16, each node the data flow graph being associated with a row of the static worksheet.

19. The method of claim 18, at least one node being associated with multiple sentences within a single row of the static worksheet.

20. The method of claim 16, a classification being assigned to the generated executable instruction.

21. The method of claim 20, the generated executable instruction being classified as a user input instruction such that when the generated executable instruction of the interactive worksheet application is executed, the user is prompted for a response and executed generated instruction integrates the response into a corresponding section of the electronic worksheet.

22. The method of claim 20, the executable instruction of the generated interactive worksheet application being classified as a user notification instruction such that when the executable instruction is executed, the user is informed of an amount to be inserted by the user into a line of an electronic tax return.

23. The method of claim 22, further comprising determining that the executable instruction of the generated interactive worksheet application has been classified as a user notification instruction, and automatically populating an electronic form of an electronic tax return with the amount for the user.

24. The method of claim 20, the executable instruction of the generated interactive worksheet application being classified as a system instruction that performs a calculation.

* * * * *